US012316352B2

(12) United States Patent
Arnavut et al.

(10) Patent No.: US 12,316,352 B2
(45) Date of Patent: May 27, 2025

(54) SYSTEM AND METHOD FOR CONCURRENT ENCRYPTION AND LOSSLESS COMPRESSION OF DATA

(71) Applicants: The Research Foundation for the State University of New York, Albany, NY (US); University of Miami, Coral Gables, FL (US); Stetson University, DeLand, FL (US)

(72) Inventors: Ziya Arnavut, Fredonia, NY (US); Basar Koc, DeLand, FL (US); Hüseyin Koçak, Coral Gables, FL (US)

(73) Assignee: The Research Foundation for the State University of New York, Albany, NY (US)

( * ) Notice: Subject to any disclaimer, the term of this patent is extended or adjusted under 35 U.S.C. 154(b) by 190 days.

(21) Appl. No.: 18/119,493

(22) Filed: Mar. 9, 2023

(65) Prior Publication Data

US 2023/0291417 A1 Sep. 14, 2023

Related U.S. Application Data

(60) Provisional application No. 63/318,181, filed on Mar. 9, 2022.

(51) Int. Cl.
*H03M 7/30* (2006.01)
*H03M 7/40* (2006.01)
*H03M 7/46* (2006.01)

(52) U.S. Cl.
CPC ....... *H03M 7/3068* (2013.01); *H03M 7/4012* (2013.01); *H03M 7/46* (2013.01)

(58) Field of Classification Search
CPC .... H03M 7/3068; H03M 7/4012; H03M 7/46; H04N 21/2347
USPC .......................................... 341/50, 59, 65, 67
See application file for complete search history.

(56) References Cited

U.S. PATENT DOCUMENTS

2015/0086013 A1* 3/2015 Metzler ............. H04N 21/2347
380/210
2023/0253981 A1* 8/2023 Cooper ............... H03M 7/3059
707/693

* cited by examiner

Primary Examiner — Peguy Jean Pierre
(74) Attorney, Agent, or Firm — Lance D. Reich; Peter Fallon

(57) ABSTRACT

A system and method for concurrent encryption and lossless compression of data with an algorithm executing on a computer platform. The lossless compression component of the algorithm consists of preprocessing the data with a Burrows-Wheeler transformation followed by an inversion ranking transformation in advance of employing an entropy coder, such as binary arithmetic coder. The frequency vector of the Inversion Ranking transformation is then encrypted and transmitted along with the compressed data with only the frequency vector encrypted. Since the frequency vector is required for decompression, no further encryption of the compressed data is necessary to secure the compressed file.

20 Claims, 30 Drawing Sheets

|   | PSNR   | SSIM   |
|---|--------|--------|
| R | 9.8485 | 0.0093 |
| G | 9.1768 | 0.0096 |
| B | 8.7840 | 0.0102 |

|   | PSNR   | SSIM   |
|---|--------|--------|
| R | 7.7448 | 0.0051 |
| G | 7.7434 | 0.0053 |
| B | 7.7533 | 0.0055 |

| | swap | | ±1 | |
|---|---|---|---|---|
| | PSNR | SSIM | PSNR | SSIM |
| R | 10.1018 | 0.0172 | 10.0631 | 0.0197 |
| G | 10.7930 | 0.0148 | 10.7571 | 0.0192 |
| B | 9.6272 | 0.0168 | 9.6170 | 0.0185 |

| | PSNR | SSIM |
|---|---|---|
| R | 8.7619 | 0.0098 |
| G | 9.2382 | 0.0101 |
| B | 8.3695 | 0.0094 |

| Image | Direction | Plain | | | Cipher | | |
|---|---|---|---|---|---|---|---|
| | | R | G | B | R | G | B |
| Kodak01 | Horizontal | 0.7897 | 0.8649 | 0.8452 | -0.0089 | -0.0158 | -0.0179 |
| | Vertical | 0.7844 | 0.8615 | 0.8437 | -0.0166 | -0.0125 | -0.0147 |
| | Diagonal | 0.7053 | 0.8076 | 0.7818 | -0.0099 | -0.0048 | 0.0155 |
| Kodak21 | Horizontal | 0.8923 | 0.9039 | 0.9257 | 0.0250 | 0.0199 | 0.0273 |
| | Vertical | 0.8937 | 0.9051 | 0.9238 | 0.0332 | 0.0254 | 0.0305 |
| | Diagonal | 0.8632 | 0.8784 | 0.9032 | 0.0346 | 0.0258 | 0.0260 |
| Mandrill | Horizontal | 0.8675 | 0.7622 | 0.8795 | 0.0247 | 0.0254 | 0.0275 |
| | Vertical | 0.8659 | 0.7648 | 0.8786 | 0.0180 | 0.0231 | 0.0252 |
| | Diagonal | 0.8563 | 0.7356 | 0.8399 | 0.0269 | 0.0248 | 0.0280 |
| Peppers | Horizontal | 0.9661 | 0.7654 | 0.8799 | 0.0486 | 0.0483 | 0.0537 |
| | Vertical | 0.9666 | 0.9820 | 0.9665 | 0.0534 | 0.0544 | 0.0509 |
| | Diagonal | 0.9570 | 0.9683 | 0.9483 | 0.0485 | 0.0510 | 0.0549 |

124

| | | Plain | | | Cipher | | |
|---|---|---|---|---|---|---|---|
| Image | Direction | R | G | B | R | G | B |
| Kodak01 | Horizontal | 0.7897 | 0.8649 | 0.8452 | -0.0089 | -0.0158 | -0.0179 |
| | Vertical | 0.7844 | 0.8615 | 0.8437 | -0.0166 | -0.0125 | -0.0147 |
| | Diagonal | 0.7053 | 0.8076 | 0.7818 | -0.0099 | -0.0048 | 0.0155 |
| Kodak21 | Horizontal | 0.8923 | 0.9039 | 0.9257 | 0.0250 | 0.0199 | 0.0273 |
| | Vertical | 0.8937 | 0.9051 | 0.9238 | 0.0332 | 0.0254 | 0.0305 |
| | Diagonal | 0.8632 | 0.8784 | 0.9032 | 0.0346 | 0.0258 | 0.0260 |
| Mandrill | Horizontal | 0.8675 | 0.7622 | 0.8795 | 0.0247 | 0.0254 | 0.0275 |
| | Vertical | 0.8659 | 0.7648 | 0.8786 | 0.0180 | 0.0231 | 0.0252 |
| | Diagonal | 0.8563 | 0.7356 | 0.8399 | 0.0269 | 0.0248 | 0.0280 |
| Peppers | Horizontal | 0.9661 | 0.7654 | 0.8799 | 0.0486 | 0.0483 | 0.0537 |
| | Vertical | 0.9666 | 0.9820 | 0.9665 | 0.0534 | 0.0544 | 0.0509 |
| | Diagonal | 0.9570 | 0.9683 | 0.9483 | 0.0485 | 0.0510 | 0.0549 |

| Image | Direction | Plain | | | Cipher | | |
|---|---|---|---|---|---|---|---|
| | | R | G | B | R | G | B |
| Kodak01 | Horizontal | 0.7897 | 0.8649 | 0.8452 | -0.0089 | -0.0158 | -0.0179 |
| | Vertical | 0.7844 | 0.8615 | 0.8437 | -0.0166 | -0.0125 | -0.0147 |
| | Diagonal | 0.7053 | 0.8076 | 0.7818 | -0.0099 | -0.0048 | 0.0155 |
| Kodak21 | Horizontal | 0.8923 | 0.9039 | 0.9257 | 0.0250 | 0.0199 | 0.0273 |
| | Vertical | 0.8937 | 0.9051 | 0.9238 | 0.0332 | 0.0254 | 0.0305 |
| | Diagonal | 0.8632 | 0.8784 | 0.9032 | 0.0346 | 0.0258 | 0.0260 |
| Mandrill | Horizontal | 0.8675 | 0.7622 | 0.8795 | 0.0247 | 0.0254 | 0.0275 |
| | Vertical | 0.8659 | 0.7648 | 0.8786 | 0.0180 | 0.0231 | 0.0252 |
| | Diagonal | 0.8563 | 0.7356 | 0.8399 | 0.0269 | 0.0248 | 0.0280 |
| Peppers | Horizontal | 0.9661 | 0.7654 | 0.8799 | 0.0486 | 0.0483 | 0.0537 |
| | Vertical | 0.9666 | 0.9820 | 0.9665 | 0.0534 | 0.0544 | 0.0509 |
| | Diagonal | 0.9570 | 0.9683 | 0.9483 | 0.0485 | 0.0510 | 0.0549 |

| | | Plain | | | Cipher | | |
|---|---|---|---|---|---|---|---|
| Image | Direction | R | G | B | R | G | B |
| Kodak01 | Horizontal | 0.7897 | 0.8649 | 0.8452 | -0.0089 | -0.0158 | -0.0179 |
| | Vertical | 0.7844 | 0.8615 | 0.8437 | -0.0166 | -0.0125 | -0.0147 |
| | Diagonal | 0.7053 | 0.8076 | 0.7818 | -0.0099 | -0.0048 | 0.0155 |
| Kodak21 | Horizontal | 0.8923 | 0.9039 | 0.9257 | 0.0250 | 0.0199 | 0.0273 |
| | Vertical | 0.8937 | 0.9051 | 0.9238 | 0.0332 | 0.0254 | 0.0305 |
| | Diagonal | 0.8632 | 0.8784 | 0.9032 | 0.0346 | 0.0258 | 0.0260 |
| Mandrill | Horizontal | 0.8675 | 0.7622 | 0.8795 | 0.0247 | 0.0254 | 0.0275 |
| | Vertical | 0.8659 | 0.7648 | 0.8786 | 0.0180 | 0.0231 | 0.0252 |
| | Diagonal | 0.8563 | 0.7356 | 0.8399 | 0.0269 | 0.0248 | 0.0280 |
| Peppers | Horizontal | 0.9661 | 0.7654 | 0.8799 | 0.0486 | 0.0483 | 0.0537 |
| | Vertical | 0.9666 | 0.9820 | 0.9665 | 0.0534 | 0.0544 | 0.0509 |
| | Diagonal | 0.9570 | 0.9683 | 0.9483 | 0.0485 | 0.0510 | 0.0549 |

|         |            | Plain  |        |        | Cipher  |         |         |
|---------|------------|--------|--------|--------|---------|---------|---------|
| Image   | Direction  | R      | G      | B      | R       | G       | B       |
| Kodak01 | Horizontal | 0.7897 | 0.8649 | 0.8452 | -0.0089 | -0.0158 | -0.0179 |
|         | Vertical   | 0.7844 | 0.8615 | 0.8437 | -0.0166 | -0.0125 | -0.0147 |
|         | Diagonal   | 0.7053 | 0.8076 | 0.7818 | -0.0099 | -0.0048 | 0.0155  |
| Kodak21 | Horizontal | 0.8923 | 0.9039 | 0.9257 | 0.0250  | 0.0199  | 0.0273  |
|         | Vertical   | 0.8937 | 0.9051 | 0.9238 | 0.0332  | 0.0254  | 0.0305  |
|         | Diagonal   | 0.8632 | 0.8784 | 0.9032 | 0.0346  | 0.0258  | 0.0260  |
| Mandrill| Horizontal | 0.8675 | 0.7622 | 0.8795 | 0.0247  | 0.0254  | 0.0275  |
|         | Vertical   | 0.8659 | 0.7648 | 0.8786 | 0.0180  | 0.0231  | 0.0252  |
|         | Diagonal   | 0.8563 | 0.7356 | 0.8399 | 0.0269  | 0.0248  | 0.0280  |
| Peppers | Horizontal | 0.9661 | 0.7654 | 0.8799 | 0.0486  | 0.0483  | 0.0537  |
|         | Vertical   | 0.9666 | 0.9820 | 0.9665 | 0.0534  | 0.0544  | 0.0509  |
|         | Diagonal   | 0.9570 | 0.9683 | 0.9483 | 0.0485  | 0.0510  | 0.0549  |

| | | Plain | | | Cipher | | |
|---|---|---|---|---|---|---|---|
| Image | Direction | R | G | B | R | G | B |
| Kodak01 | Horizontal | 0.7897 | 0.8649 | 0.8452 | -0.0089 | -0.0158 | -0.0179 |
| | Vertical | 0.7844 | 0.8615 | 0.8437 | -0.0166 | -0.0125 | -0.0147 |
| | Diagonal | 0.7053 | 0.8076 | 0.7818 | -0.0099 | -0.0048 | 0.0155 |
| Kodak21 | Horizontal | 0.8923 | 0.9039 | 0.9257 | 0.0250 | 0.0199 | 0.0273 |
| | Vertical | 0.8937 | 0.9051 | 0.9238 | 0.0332 | 0.0254 | 0.0305 |
| | Diagonal | 0.8632 | 0.8784 | 0.9032 | 0.0346 | 0.0258 | 0.0260 |
| Mandrill | Horizontal | 0.8675 | 0.7622 | 0.8795 | 0.0247 | 0.0254 | 0.0275 |
| | Vertical | 0.8659 | 0.7648 | 0.8786 | 0.0180 | 0.0231 | 0.0252 |
| | Diagonal | 0.8563 | 0.7356 | 0.8399 | 0.0269 | 0.0248 | 0.0280 |
| Peppers | Horizontal | 0.9661 | 0.7654 | 0.8799 | 0.0486 | 0.0483 | 0.0537 |
| | Vertical | 0.9666 | 0.9820 | 0.9665 | 0.0534 | 0.0544 | 0.0509 |
| | Diagonal | 0.9570 | 0.9683 | 0.9483 | 0.0485 | 0.0510 | 0.0549 |

134

SYSTEM AND METHOD FOR CONCURRENT ENCRYPTION AND LOSSLESS COMPRESSION OF DATA

CROSS-REFERENCE TO RELATED APPLICATION

This application claims the benefit of U.S. Provisional Patent Application No. 63/318,181, filed on Mar. 9, 2022, the entirety of which is hereby incorporated herein by this reference.

BACKGROUND OF THE INVENTION

1. Field of the Invention

The present invention generally relates to data compression and encryption. More particularly, the present invention relates to systems and methods for concurrent encryption and lossless compression of data.

2. Description of the Related Art

Security and efficiency are two significant challenges for storing or transmitting data between computer devices across networks, such as the Internet. This challenge is more significant with especially large files such as multimedia files. These issues are normally addressed with two separate processes on data performed in sequence: compression-then-encryption (CtE), or encryption-then-compression (EtC).

Many compression and encryption algorithms have been developed over the past several decades. While some of these algorithms are general-purpose, many of them are designed to be used on specific data types. Some of the well-known generic lossless data compressors include, for example, Gzip, Bzip2, and entropy coders such as Huffman and arithmetic coder. For better compression gains, there are compressors designed for specific multimedia types such as video, audio, and graphic images.

Among the general-purpose encryption algorithms, the Advanced Encryption Standard (AES) is currently considered the top standard. There are numerous approaches to image encryption, e.g., selective encryption, permutations, substitutions, chaotic dynamics. Currently, the design of new image encryption algorithms by exploiting the hallmark of chaotic dynamical systems-sensitive dependence on initial conditions is a particularly popular endeavor. However, many extant image encryption algorithms have security concerns for the encrypted data.

While compression algorithms exploit data redundancy or local correlations, encryption algorithms try to randomize data as much as possible. Consequently, it is customary first to compress data and then encrypt it. Some of those skilled in the art refer to this as a "naive" approach. However, using one of the modern cryptosystems, such as AES, this so-called naive approach is often the only provably secure one.

In certain settings, such as the real-time transmission of multimedia content, encrypting with AES can be costly in terms of overhead and latency, and thus, a trade-off between security and other considerations may become necessary. Depending on the application, various approaches have been proposed to address these trade-off considerations.

One approach is to encrypt first and then compress. This can become desirable, for example, when a sender may have limited computational resources but wants to preserve secrecy. In this order, the sender only encrypts the data and hands it over to a service provider. The service provider, who has no knowledge of the encryption key, compresses the encrypted data for transmission and hands over the compressed data to the receiver. The receiver then decompresses and then decrypts it to recover the original data. There have been numerous studies to construct practical EtC algorithms, but the compression part of the majority of these algorithms still cannot compete with the state-of-the-art lossless compression algorithms. For certain data types, gray-scale images, for instance, they come close to lossless compression. The third group of algorithms employs a joint or hybrid scheme where the encryption and compression procedures are handled together.

In 1994, Michael Burrows and David Wheeler presented "A Block-sorting Lossless Data Compression Algorithm," which has become known as Burrows-Wheeler Compression (BWC) and consists of three steps: (1) transformation of the data with an invertible transformation, called Burrows-Wheeler Transformation (BWT); (2) Move-to-Front (MTF) coding; and (3) compression with a modified Huffman coder. BWC is a general-purpose lossless compression algorithm that does well on both text and non-text data and achieves compression comparable to Lempel-Ziv based compressors.

In later versions of the BWT, the MTF step was replaced by Inversion Ranking transformation. Later, the modified Huffman entropy coder was changed to a variant of an arithmetic coder. This modified compression algorithm, called Burrows-Wheeler with Inversion Coder (BWIC), did improve the compression gains. On average, BWIC compresses better than most general-purpose compressors such as Gzip and Bzip2. Moreover, BWIC has been shown to perform better than JPEG 2000 and JPEG-LS on certain medical images.

However, most compression of data is still performed in separate steps, which is expensive in both computational resources and latency. It would be advantageous to have an effective and efficient single-step compression and encryption of data to minimize these issues. It is thus to address the deficiency of prior art compression and encryption algorithms and methodologies that the present invention is primarily directed.

BRIEF SUMMARY OF THE INVENTION

Briefly described, the present system and method provides for secure and efficient transmission or storage of data files are commonly compressed and encrypted. The system utilizes a cost-effective encryption method of a lossless compression algorithm, thus avoiding the added cost of employing two separate processes. The system and method utilize preprocessing of data with a Burrows-Wheeler Transformation followed by an inversion ranking transformation in advance of the utilization of an entropy coder, which results in an extremely effective general-purpose lossless compression technique. The frequency vector of the inversion ranking transformation is encrypted and transmitted along with the compressed data. Since the frequency vector is required for decompression, no further encryption is necessary to secure the compressed file. Thus, encrypting only a relatively small section of data (for example, 1024 bytes for files up to 4 GB in size) containing the frequency vector instead of the entire compressed file results in a substantial reduction in computational cost. The present concurrent encryption and lossless data compression technique is effective and resistant to common attacks using various cryptanalysis techniques on image and audio data sets.

The present encryption and lossless compression algorithm consists of compressing the input data with a modified compressor, called Burrows-Wheeler with Inversion Coder (BWIC), while isolate the inversion frequency vector obtained from inversion ranking transformation in the second stage and encrypting it for transmission over a non-secure channel along with the compressed data. Since the inversion frequency vector is necessary for decompression, no further encryption is required to secure the compressed data. Thus, encrypting only the inversion frequency vector, instead of the entire compressed file, results in substantial savings in computational cost while providing secure files that are resistant to the more common attacks on image and audio data sets.

Thus, in one embodiment, the system for concurrent encryption and lossless compression of data includes a computer platform configured to receive and transmit one or more data files, a frequency vector module resident on the computer platform that selectively calculates and stores an inversion frequency vector for encryption, and a lossless compressor. The lossless compressor includes a BWT module that selectively performs a Burrows-Wheeler transformation on one or more data files received at the computer platform, thereby creating one or more Burrows-Wheeler transformed files, an inversion coder that selectively performs an inversion ranking transformation on the one or more Burrows-Wheeler transformed files thereby creating one or more inversion files, where the inversion coder is in selective communication with the frequency vector module such that the frequency vector module calculates an inversion frequency vector for the one or more inversion files. The lossless compressor also includes a zero-run-length encoder that selectively compresses the one or more inversion files thereby creating one or more zero-run-length files, and an entropy coder that selectively compresses the one or more zero-run-length files to create one or more fully compressed files. The frequency vector module further encrypts the inversion frequency vector and joins the encrypted inversion frequency vector with the one or more fully compressed files, thereby creating one or more encrypted and compressed output files.

The computer platform can be in selective communication with a network and further configured to selectively transmit the one or more encrypted and compressed output files across the network. In such embodiment, the computer platform can selectively receive one or more encrypted and compressed output files from the network, and computer platform can include a decompressor that decrypts and uncompresses the received one or more encrypted and compressed output files. The frequency vector module and lossless compressor can be configured in firmware, software, or both, resident on the computer platform.

In one embodiment, the frequency vector module further encrypts the inversion frequency vector with an Advanced Encryption Standard (AES) Cipher Algorithm. Other encryption protocols can be used to encrypt the inversion frequency vector. Additionally, in one embodiment, the entropy coder is a binary arithmetic coder.

Accordingly, BWIC is an effective general-purpose lossless data compression algorithm wherein each input data set generates its unique inversion frequency vector, which does not negatively affect compression efficiency. Thus, regardless of the input data size, only the frequency vector, for example, a small file of 1024 bytes, needs to be encrypted for transmission over a non-secure channel.

In contrast to the prior art methods where data files are commonly compressed and encrypted in separate processes, the present invention provides a cost-effective encryption method of files as a built-in component of a lossless compression algorithm, thus avoiding the added cost of employing two separate processes. The process is also fast because encryption time is always a fixed cost (such as 1024 bytes), whereas in other methods, encryption time will increase with file size.

The present invention is therefore advantageous as it provides an efficient and secure manner to both compress and encrypt data files concurrently, in an economic manner limiting the computational overhead for both processes. The present invention has industrial applicability in that it can be used in computer systems to produce tangible compressed and encrypted data files and allow secure access to the files while conserving computer resources in both the creation and retrieval of the secure files. Other advantages of the present invention will be apparent to one of skill in the art after review of the Drawings, Specification, and Claims set forth herein.

DETAILED DESCRIPTION OF THE INVENTION

Figure 1:
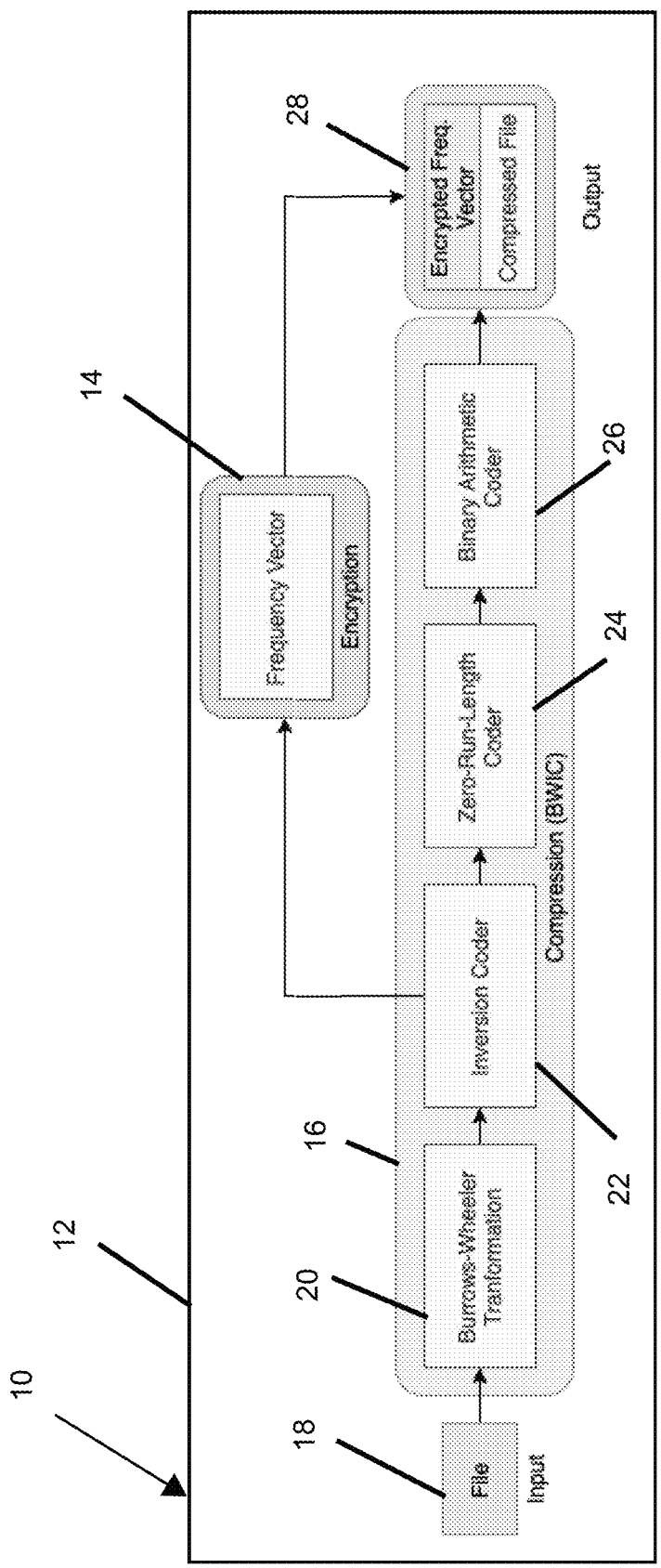
FIG. 1 is a schematic diagram of one embodiment of a concurrent encryption and lossless compression system.

With reference to the figures in which like numerals represent like elements throughout the several views, FIG. 1 is a schematic diagram of one embodiment of a concurrent encryption and lossless compression system 10 for concurrent encryption and lossless compression of data which includes a computer platform 12 configured to receive and transmit one or more data files, such as input file 18. A frequency vector module 14 is resident on the computer platform 12 that selectively calculates and stores an inversion frequency vector for encryption, and a lossless compressor 16 is also resident. The lossless compressor 16 includes a BWT module 20 that selectively performs a Burrows-Wheeler transformation on one or more data files 18 received at the computer platform 12, thereby creating one or more Burrows-Wheeler transformed files. There is an inversion coder 22 that selectively performs an inversion ranking transformation on the one or more Burrows-Wheeler transformed files thereby creating one or more inversion files, where the inversion coder is in selective communication with the frequency vector module 14 such that the frequency vector module calculates an inversion frequency vector for the one or more inversion files.

The lossless compressor 16 also includes a zero-run-length encoder 24 that selectively compresses the one or more inversion files thereby creating one or more zero-run-length files, and an entropy coder, shown here as a binary arithmetic coder 26, selectively compresses the one or more zero-run-length files to create one or more fully compressed files. The frequency vector module 14 further encrypts the inversion frequency vector and joins the encrypted inversion frequency vector with the one or more fully compressed files, thereby creating one or more encrypted and compressed output files 28.

In this embodiment, the forward algorithm starts with the input file 18 being processed with BWT at BWT module 20. Next, an inversion ranking is applied to the transformed data at inversion coder 22. The calculated inversion frequency vector (is stored for later use in encryption. To complete the compression process, the output of the inversion coder 22 is compressed with the zero-run-length encoder 24 (RLE-0) and the context-modeled binary arithmetic coder 26. After the completion of the compression process, the stored inversion frequency vector is encrypted for transmission over a non-secure channel. Depending on the intended use of the application, one can choose an encryption algorithm from various standards to encrypt the inversion frequency vector, such as the Advanced Encryption Standard (AES) Cipher Algorithm (128, 192, and 256 bits).

The efficiency of the present algorithm lies in the fact that, instead of encrypting the entire input file 18, regardless of the file size, only a much smaller inversion frequency vector needs to be encrypted. For example, assume that the alphabet in the input data contains at most 256 symbols, ordered lexicographically, because the algorithm processes data one byte at a time. The alphabets of certain data types may contain fewer symbols. In most multimedia files, however, all 256 symbols are usually present. Since the number of entries of F is the same as the number of symbols in the alphabet, the inversion frequency vector F has 256 symbols as well. The entries of F are the frequencies of the symbols in the alphabet. Each entry of F is stored using 4 bytes and thus, the total size of F is 1024 bytes. Larger file sizes greater than 4 GB will necessarily cause the use of more than 4 bytes for each F entry.

The Burrows-Wheeler Transformation (BWT) is a well-known lossless data compression algorithm, such as is used in Bzip2, but it is not commonly used in encryption. The forward transformation, for a given data string, for example, is described below:

$$w=[2,4,3,4,2,4,1,1,2,3,1],$$

TABLE 1

Forward Burrows-Wheeler Transformation

| index | M | $\overline{M}$ |
|---|---|---|
| 0 | 24342411231 | 11231243424 |
| 1 | 43424112312 | 12312434241 |
| 2 | 34241123124 | 12434241123 |
| 3 | 42411231243 | 23124342411 |
| 4 | 24112312434 | 24112312434 |
| 5 | 41123124342 | 24342411231 |
| 6 | 11231243424 | 31243424112 |
| 7 | 12312434241 | 34241123124 |
| 8 | 23124342411 | 41123124342 |
| 9 | 31243424112 | 42411231243 |
| 10 | 12434241123 | 43424112312 |

The matrix M is constructed as follows: The first row of M is the original data ω. The succeeding rows are obtained by left-shifting the previous row. The resulting matrix M is displayed in the second column of Table 1. We next sort the rows of M lexically, as seen in the third column of Table 1 under the heading $\overline{M}$. Finally, we transmit the last column:

$$\overline{w}=[4,1,3,1,4,1,2,4,2,3,2]$$

of $\dot{M}$ along with the index i of ω in the sorted matrix $\dot{M}$ to the receiver (in this example, i=5, since ω is located at the fifth entry).

For the inverse BWT, upon receiving the last column $\dot{\omega}$ of $\dot{M}$, and the index (row number) i of ω in $\dot{M}$, we construct the original data string ω as follows. First, by sorting the elements of $\dot{\omega}$, we obtain the first column $\dot{C}$ of $\dot{M}$. The characters in column i have an interesting property due to cyclical shifting. Each character in $\dot{\omega}$ is the prefix character of the corresponding element of $\dot{C}$. This relationship dictates a 1-1 mapping between the elements of $\dot{\omega}$ and $\dot{C}$. By locating the elements of $\dot{C}$ in $\dot{\omega}$ from top to bottom, we obtain a permutation P which then is used to obtain the elements of ω with simply N=|ω| iterations. To obtain the data elements of ω, using the row index i of ω, we locate and print $\dot{C}_i$ in row i. Using the $P_i$ in permutation array P as the new index i (i=Pi) we print the next element of ω located in $\dot{C}_i$. Repeating the process, we obtain all the elements of ω.

For our example, we can construct Table II using $\dot{\omega}$ as described above. Since ω is located in the first row (i=5), our first element is $\dot{C}_5$=2. The next element's index is $P_5$=10. Thus, the element that follows $\dot{C}_5$=2 is $\dot{C}_{10}$=4, and since $P_{10}$=7 the following element is $\dot{C}_7$=3. The element that follows $\dot{C}_7$=3 is located at $P_7$=9 and is $\dot{C}_9$=3. Repeating this process N=|ω| times, we obtain the original input string ω.

TABLE 2

Inverse Burrows-Wheeler Transformation

| index | Ċ | ω̄ | P |
|---|---|---|---|
| 1 | 1 | 4 | 1 |
| 1 | 1 | 1 | 3 |
| 2 | 1 | 3 | 5 |
| 3 | 2 | 1 | 6 |
| 4 | 2 | 4 | 8 |
| 5 | 2 | 1 | 10 |
| 6 | 3 | 2 | 2 |
| 7 | 3 | 4 | 9 |
| 8 | 4 | 2 | 0 |
| 9 | 4 | 3 | 4 |
| 10 | 4 | 2 | 7 |

Inversion ranking (IR) transformation, also called "inversion coding" (IC), is commonly used to measure sortedness of a permutation or a sequence. It can also be employed effectively in lossless data compression. The encoding (forward) and decoding (backward or inverse) of IR can be demonstrated with the aid of a specific example.

Here, for illustration, we consider the specific input data vector:

$$\bar{w}=[4,1,3,1,4,1,2,4,2,3,2]$$

which was the output of BWT from the previous section. We scan ώ and create the alphabet set A which includes all the symbols (characters) used in ώ:

$$A=\{1,2,3,4\}.$$

As we scan ώ to construct A, we also collect the frequency of each character in A and store it in a vector F:

$$F=\{3,3,2,3\}$$

which is the frequency vector. The number of entries of F is the same as the number of symbols in the alphabet, and the sum of the entries of F is the length of the input data vector ώ.

Next, we compute four vectors $g_i$, called the inversion rank vectors, for each character $A_i$ in the alphabet, as follows. The first entry of each vector $g_i$ is the position index of the first occurrence of the character $A_i$ in ώ:

$$\bar{w} = [4, 1, 3, 1, 4, 1, 2, 4, 2, 3, 2]$$
$$\underline{1,2,3,4,5,6,7,8,9,10,11}$$

$$g_1 = [2, \ldots]$$
$$g_2 = [7, \ldots]$$
$$g_3 = [3, \ldots]$$
$$g_4 = [1, \ldots].$$

For each character $A_i$, we calculate the inversion rank (distance) between the $A_i$ and the next $A_i$ in ώ, where the inversion rank is the number of elements that are greater than $A_i$ between two consecutive $A_i$s in ώ. This way, we obtain all the entries of the four vectors:

$$g_1=[2,1,1]$$
$$g_2=[7,1,1]$$
$$g_3=[3,2]$$
$$g_4=[1,0,0]$$

Note that the entries of the frequency vector F are the lengths of the vectors $g_i$. After calculating the inversion ranks for each character, we concatenate all the $g_i$ vectors to obtain the inversion vector:

$$\underline{w} = [\underbrace{2, 1, 1}_{g_1}, \underbrace{7, 1, 1}_{g_2}, \underbrace{3, 2}_{g_3}, \underbrace{1, 0, 0}_{g_4}].$$

As the output of the IR process, the algorithm provides the alphabet A, the frequency vector F, and the inversion vector ω̲. From F, we can determine the size of ω̲, and from ω̲ we can identify all the $g_i$s.

To decode, one needs A, F and ω̲. With F, we extract the inversion rank vectors $g_i$s from ω̲:

$$A = \{1, 2, 3, 4\}$$
$$F = [3, 3, 2, 3]$$
$$\underline{w} = [\underbrace{2, 1, 1}_{g_1}, \underbrace{7, 1, 1}_{g_2}, \underbrace{3, 2}_{g_3}, \underbrace{1, 0, 0}_{g_4}].$$

$$g_1 = [2, 1, 1]$$
$$g_2 = [7, 1, 1]$$
$$g_3 = [3, 2]$$
$$g_4 = [1, 0, 0].$$

The first element of each inversion rank vector $g_i$ is the position of the first occurrence of the character $A_i$ in the input vector ώ, as shown below:

$$\bar{w} = [4, 1, 3, \_, \_, \_, 2, \_, \_, \_, \_]$$
$$\underline{1,2,3,4,5,6,7,8,9,10,11}$$

Using this information, the decoding process starts by recovering the original elements of the input vector. For example, in the vector $g_1$, the rank 1 following index 2 represents that there is one character greater than the current symbol "1" located at the $2^{nd}$ position in ώ. Hence, we skip one position and insert the character "1" in ώ to the $4^{th}$ position:

$$\bar{w} = [4, 1, 3, 1, \_, \_, 2, \_, \_, \_, \_]$$
$$\underline{1,2,3,4,5,6,7,8,9,10,11}$$

Similarly, since the third value in $g_1$ is 1, we insert the third "1" after skipping one location to the $6^{th}$ position in ώ:

$$\bar{w} = [4, 1, 3, 1, \_, 1, 2, \_, \_, \_, \_]$$
$$\underline{1,2,3,4,5,6,7,8,9,10,11}$$

After inserting "1"s, we process other characters, for example "2", using $g_2$. The second value in $g_2$ is 1, which means that there is one element bigger than the "2" located at position 7. Hence, the second "2" is located at the $9^{th}$ position in ώ. Similarly, since the third value in $g_2$ is 1, we skip one location in ώ and insert the third "2" to $11^{th}$ position. By following the process as described above, one recovers all the elements of the input vector ώ. It is evident from the foregoing example that without the knowledge of the correct frequency vector F, decoding cannot proceed. The encryption component of in the system, wherever resident and however embodied, encrypts F for transmission over a non-secure channel. Since F is much smaller than the data string, this results in an efficient encryption.

A Burrows-Wheeler Inversion Coder (BWIC) is a general-purpose lossless data compressor. The algorithm consists of four main stages, all of which are reversible. In the first stage, data is transformed with the lexical block-sorting algorithm BWT. During the transformation, while the histogram and size of data do not change, the order of data is re-organized by collecting similar values to increase redundancy. The lexical sorter used in this stage requires O(N log N) to complete the transformation. In the second stage, the transformed data is processed with the IC to exploit redundancies. The IC process requires O(N log N) time.

In the third stage, the data pre-processed with BWT and inversion ranks is encoded with the zero-run-length-encoder (RLE-0). The RLE-0 plays an essential role in reducing a large number of zeros produced by inversion ranks in the previous stage and prepares the transformed but uncompressed data for the entropy coder in the next stage. The RLE-0 requires O(N) time to complete. The final stage of BWIC is the utilization of an entropy coder. A context-modeled binary arithmetic coder achieves the best compression gain. This stage requires O(N) time. Thus, the BWIC process requires O(N log N) time.

The effectiveness of BWIC as a general-purpose lossless data compression has been demonstrated in various studies. For example, on a set of gray-scale X-ray images, gains over JPEG 2000 (4.1%) and JPEG-LS (5.1%) were reported. In a more recent study, BWIC was shown as also effective in compression of various colored medical images with better compression gains over JPEG 2000 and JPEG-LS, 20.4% and 5.6%, respectively.

To demonstrate the performance of BWIC on audio files, an audio test data set was used including sixteen speech signals in American English, spoken by eight male and eight female speakers, that are recommended by the International Telecommunication Union (ITU) for speech transmission testing. These and other speech signals in nineteen additional languages are provided as an appendix to Recommendation ITU-T P.50. The remaining entries in the audio test set are several classical and popular music snippets. The efficiency of BWIC on audio files over other well-known generic compressors is evident from Table 3. Specifically, BWIC achieves better compression gains, 15.8%, 15.7%, and 1.4% over Zip, Gzip, and Bzip2, respectively.

Table 3 is a comparative compression gains of Zip, Gzip, Bzip2, and BWIC on a test set of audio files:

| Audio Files(wav) | File Size | Zip | Gzip | Bzip2 | BWIC |
|---|---|---|---|---|---|
| A_eng_f1 | 385,396 | 274,117 | 273,519 | 219,717 | 213,949 |
| A_eng_f2 | 369,454 | 273,838 | 273,281 | 226,924 | 223,284 |
| A_eng_f3 | 328,650 | 234,560 | 234,003 | 188,384 | 182,572 |
| A_eng_f4 | 318,560 | 251,322 | 250,765 | 219,810 | 217,169 |
| A_eng_f5 | 420,494 | 313,847 | 313,290 | 257,723 | 255,459 |
| A_eng_f6 | 419,862 | 310,897 | 310,340 | 256,007 | 253,110 |
| A_eng_f7 | 405,068 | 298,491 | 297,934 | 248,759 | 245,826 |
| A_eng_f8 | 443,894 | 328,311 | 328,176 | 268,404 | 265,928 |
| A_eng_m1 | 405,416 | 286,423 | 235,866 | 234,414 | 231,419 |
| A_eng_m2 | 327,650 | 250,455 | 249,898 | 205,657 | 282,321 |
| A_eng_m3 | 313,396 | 239,311 | 238,754 | 204,001 | 200,812 |
| A_eng_m4 | 355,492 | 262,257 | 261,700 | 221,653 | 219,520 |
| A_eng_m5 | 467,950 | 350,074 | 389,559 | 294,982 | 290,863 |
| A_eng_m6 | 462,800 | 348,126 | 347,569 | 295,740 | 291,881 |
| A_eng_m7 | 436,848 | 330,731 | 330,174 | 276,019 | 271,629 |
| A_eng_m8 | 446,292 | 334,342 | 333,744 | 280,037 | 276,298 |
| ImperialMarch60 | 2,646,044 | 2,327,385 | 2,327,207 | 1,998,462 | 1,982,764 |
| PinkPanther60 | 2,646,044 | 2,250,574 | 2,250,398 | 1,846,584 | 1,817,867 |
| StarWars60 | 2,646,044 | 2,495,370 | 2,495,197 | 2,294,905 | 2,258,142 |
| Total F. Size | 14,245,374 | 11,760,431 | 11,751,374 | 10,039,188 | 9,800,913 |
| Ratio | | 0.826 | 0.825 | 0.705 | 0.695 |

The performance of BWIC on large text files demonstrates that BWIC achieves 3.8% better compression than Bzip2 on the Calgary Corpus, and on the larger files in the Canterbury Corpus, the improvement increases to 10.8%. An executable code of BWIC compressor and decompressor are commonly available.

Figure 3:
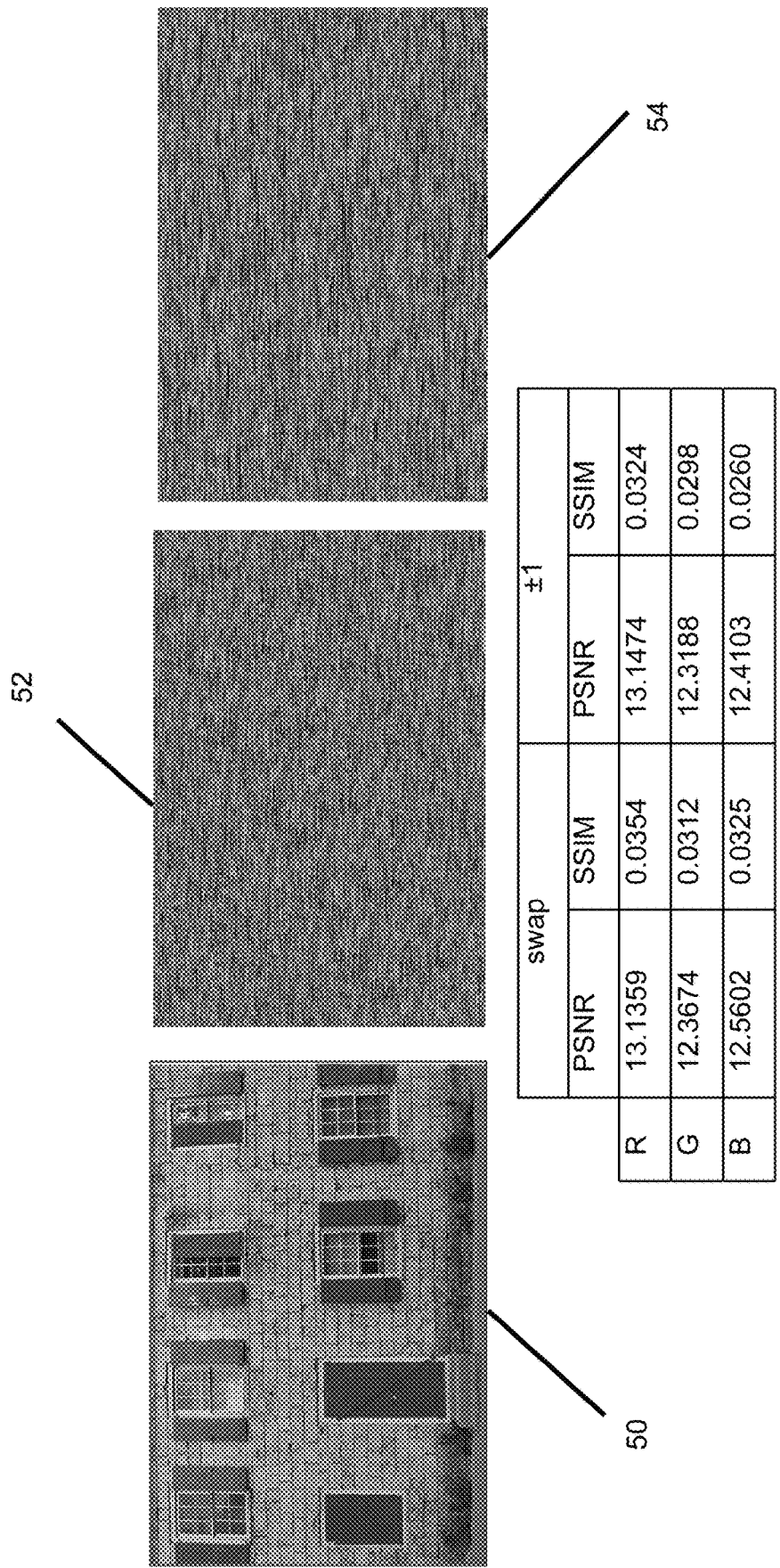
FIG. 3 is an exemplary image illustrating several decryptions with swap perturbation of entries of the correct key (inversion frequency vector).

The gains in the run-times of the encryption part of present algorithm are demonstrated such as by the Kodak image 50 in FIG. 3, which has a resolution of (768×512), and each pixel is represented with 3 bytes (1-byte per RGB channel). The size of this image, after compressing it with BWIC, is 556,603 bytes. In a standard computing environment, encrypting this compressed file takes 12.30 ms, yet encrypting the frequency vector requires only 0.024 ms.

Figure 2:
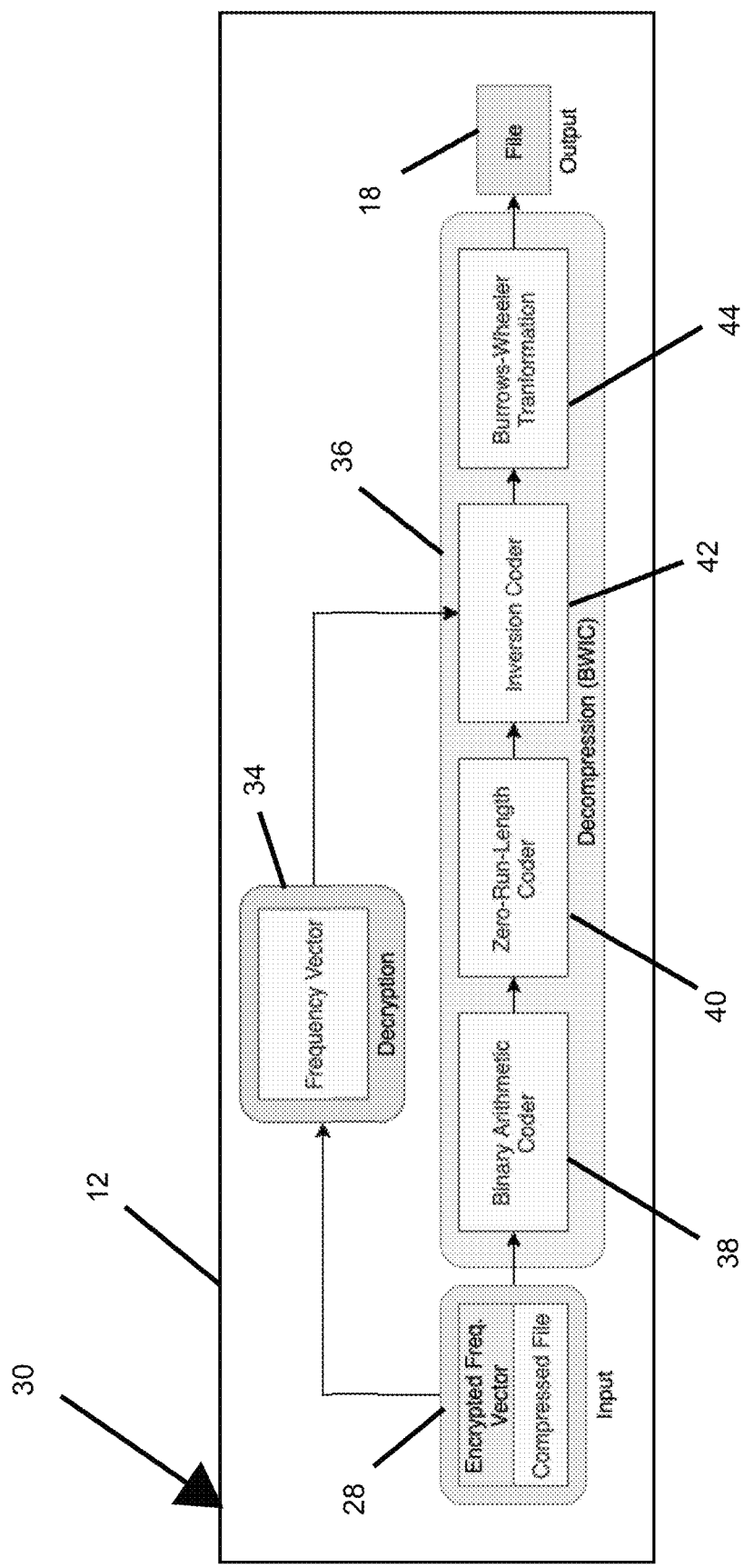
FIG. 2 is a schematic diagram of one embodiment of a concurrent decryption and lossless compression system.
Figure 17:
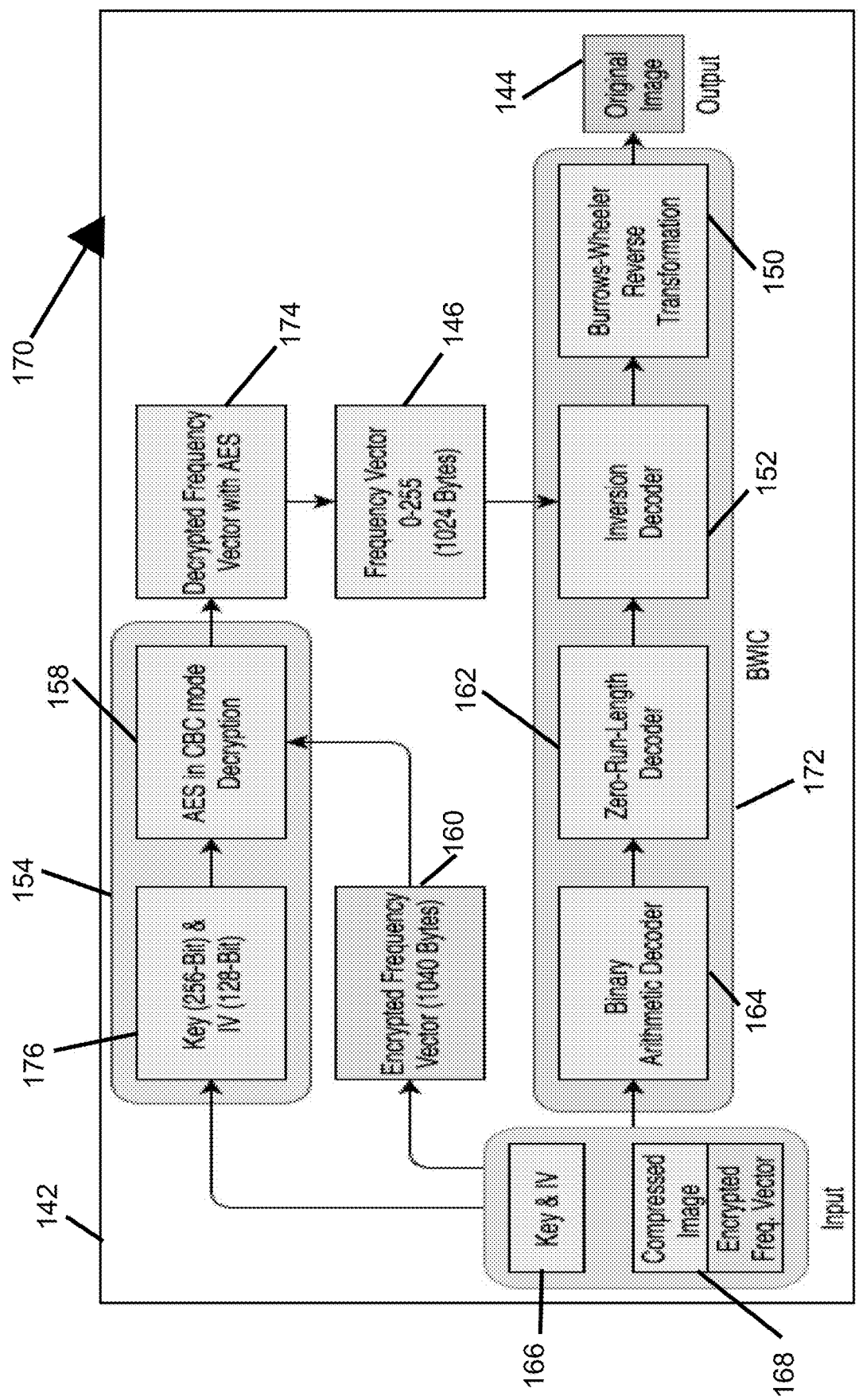
FIG. 17 is a schematic diagram of one embodiment of a concurrent decryption and lossless compression system.

FIG. 2 is a schematic diagram of one embodiment of the decryption-decompression system 30 that essentially traces the steps of the encryption-compression in reverse order. This process is also depicted in the embodiment of FIG. 17. First, the encrypted inversion frequency vector is extracted from the input file 28 and decrypted at frequency vector module 34. With the necessary inversion frequency vector at hand, the decompression steps proceed with the BWIC decompressor, yielding the original file as the output.

FIG. 2 illustrates the system on computer platform 12, which can be the same platform for the compressor 16 in FIG. 2, and the frequency vector module 34 is resident on the computer platform 30 with a decompressor 36 also resident. The lossless decompressor 36 basically runs in the reverse order to the compressor 16. The entropy coder, shown here as a binary arithmetic coder 38, receives the decrypted data stream of the file and start to selectively uncompress it to create one or more zero-run-length files for the a zero-run-length encoder 40 that selectively decompresses them to create one or more inversion files sent to the inversion coder 42 that selectively reverses the inversion ranking transformation to create one or more Burrows-Wheeler transformed files which are sent to the BWT module 44 that selectively performs a reverse Burrows-Wheeler transformation to create a fully decrypted and uncompressed one or more data files 18 at the computer platform 12.

The encryption component of the concurrent encryption/compression algorithm consists of encrypting the unique inversion frequency vector of an input file for secure transmission. Without the correct inversion frequency vector, the decompression cannot be performed to recover the original file. However, there remains the possibility of guessing or reconstructing the inversion frequency vector of an input file through malicious attacks. Encrypted files created under the present concurrent encryption/compression system, however, are secure against various commonly such-employed attacks, e.g., brute force, histogram, correlation, etc. In particular, the keyspace is sufficiently large and to demonstrate the key sensitivity.

For reference, one can refer to the inversion frequency vector of an input file as the key. This should not be confused with an encryption key used by a standard encryption algorithm (e.g. AES) for the purpose of secure transmission of an inversion frequency vector.

Brute force attack is one of the most commonly employed attacks where the attacker employs an exhaustive procedure to try every possible key. To guard against brute force attack, the number of possible keys must be large. A mathematical analysis of the keyspace of the present invention demonstrates the robustness of the encryption. For input files, we will use an alphabet of 256 symbols and order the alphabet as an increasing sequence according to the values of the symbols. Let $\omega$ be an input data string (plaintext) of N symbols from the alphabet for IC. We will denote the length of $\omega$ by N. The output string (ciphertext) $\underline{\omega}$ will also be a data string of length N. The only piece of information one can extract from the ciphertext is the sum of the entries of the inversion frequency vector (key) $F=[f_1, f_2, \ldots, f_{256}]$:

$$\sum_{i=1}^{256} f_i = N.$$

If some of the symbols of the alphabet are not used in the plaintext $\omega$, then the corresponding entries of F will be zero. We will consider two scenarios for guessing F by brute force depending on the absence or presence of zero entries.

In the first scenario, we assume that the data length is large compared to the number of symbols used in the alphabet and that all the symbols of the alphabet appear in the data file. Therefore, all of the entries of F will be nonzero. To guess F by brute force, one must try all frequency vectors of length 256 whose entries sum to N.

To enumerate all possible such F, we will use the theory of compositions of positive integers. The notion of compositions of a positive integer is related to the well-known notion of partitions of a positive integer. However, in partitions, the order of summands of partitions does not matter. In compositions, the order does matter.

For this example, let N and k be positive integers with k≤N. A sequence of positive integers $a_i>0$ for $i=1, \ldots, k$ is called a composition of N with k parts if:

$$a_1+a_2+ \ldots +a_k=N.$$

Thus, a formula for the number of possible k-part compositions is: For positive integers N and k with k≤N, the number of compositions of N into k parts is:

$$\binom{N-1}{k-1}.$$

As an example, we consider a gray-scale image file of size 768×512. Since there are 393216 pixels in total, the length of the file is N=393216. Moreover, because of our assumption that all 256 symbols in the alphabet are used in the image file, we take k=256. From the theorem above, the number of k-part compositions of N is:

$$\binom{393216-1}{256-1} = \underbrace{11741 \ldots 495}_{923 \text{ digits}}.$$

which is larger than $2^{2048}$. The number of necessary trials to find the correct N by a brute force attack is indeed enormous.

In the second scenario, we continue to assume that the data length is large compared to the number of symbols in the alphabet but some of the symbols are not used in the data file. In this case, some of entries of F will be zero. To enumerate all possible such keys, we will use the theory of weak compositions of positive integers. Note that the notion of weak compositions of a positive integer is similar to that of compositions with the additional assumption that zero is permitted as a summand.

Thus, let N and k be positive integers with k≤N. A sequence of nonnegative integers $a_i \geq 0$ for $i=1, \ldots, k$ is called a weak composition of N with k parts if:

$$a_1+a_2+ \ldots +a_k=N.$$

As a toy example, let us consider the alphabet A={1, 2, 3, 4} consisting of four symbols and the plaintext $\hat{\omega}$=[2, 4, 1, 4, 1]. The corresponding ciphertext is $\underline{\omega}$=[3, 1, 1, 2, 0] with the frequency vector F=[2, 1, 0, 2]. To guess F by brute force, one must try all weak compositions of N=5 with 4-parts. The number of such parts can be determined as follows: For positive integers N and k with k≤N, the number of weak compositions of N into k parts is $$\binom{N+k-1}{k-1}.$$

For our toy example, where N=5 and k=4, the number of possible frequency vectors is $$\binom{5+4-1}{4-1} = 56.$$

To find the correct F by brute force, one can, of course, try all 56 weak compositions. However, there is another more economical mode of brute force attack. The idea in this second mode of attack is to try frequency vectors with positive entries while increasing their lengths. The advantage of this form of attack is that there are fewer possible F to try, but the downside is the loss of information about the missing symbols in the plaintext.

As an example of this form of attack on our toy example. For k=1, there is only one frequency vector F=[5] to try, which fails. For k=2, there are 4 such vectors, [4, 1], [3, 2],

[2, 3], [1, 4], and they all fail. For k=3, there are 6 such vectors, [3, 1, 1], [2, 2, 1], [2, 1, 2], [1, 3, 1], [1, 2, 2], [1, 1, 3], and the frequency vector [2, 1, 2] among them can be used to decode the ciphertext. Note that so far the attacker tried 11 different frequency vectors. Once the attacker finds the corresponding frequency vector for decoding the ciphertext, the attacker still needs to determine which 3-element subset of the alphabet is used. There are 4 such possible subsets. In sum, while the first mode of attack required 56 frequency vectors, this second mode of attack requires only 15 frequency vectors. It is now evident that this second mode of attack is more efficient than the previous one for the toy example.

However, there is a general computational cost of the second mode of attack. For a given ciphertext $\underline{\omega}$ of length N, one starts trying frequency vectors with positive entries and length k, and increase k from 1 until one finds an appropriate frequency vector to invert the ciphertext $\underline{\omega}$. These frequency vectors will be k-part compositions of N. If we assume that the successful frequency vector is a k-part composition of N, then the number of frequency vectors the attacker must try is $$\sum_{k=1}^{K} \binom{N-1}{k-1}.$$

A successful frequency vector of length K reveals that plaintext uses only symbols of the alphabet. However, it is not feasible to infer from the ciphertext $\underline{\omega}$ the location of the zero entries of F. Therefore, the attacker must try all $$\binom{256}{K}$$

K-elements subsets of the alphabet to determine the plaintext. In typical intended use of the concurrent encryption and compression algorithm, data files, e.g. image and audio, are usually large and most of the symbols in the alphabet are used. As an example, let us consider an image file with 393216 pixels and suppose that 246 of the 256 symbols are used. In this case, $$\sum_{k=1}^{246}\binom{393216-1}{k-1} = \underbrace{13009\ldots 303}_{891\ digits} \text{ and } \binom{256}{246} = 278826214642518400.$$

It is evident from the foregoing considerations that the key space of our present algorithm is sufficiently large to resist brute force attacks.

Furthermore, an effective cryptosystem must exhibit key sensitivity. There are two considerations for key sensitivity testing: (i) Encryption of plaintext with a set of keys with minor differences should generate vastly different ciphertext. This is not an issue for the present encryption process because each plaintext generates its unique key (frequency vector); (ii) Decryption of ciphertext with keys that are arbitrarily close to the correct key should not reveal any recognizable feature of the original plaintext. This is addressed in the present system.

Since the sum of the entries of the correct key is known, one can use the following two small perturbations of a correct key to test key sensitivity: swap: A randomly chosen entry of the correct key is swapped with an adjacent entry. ±1 The value of a randomly chosen entry of the correct key is increased by 1, while the value of an adjacent entry is decreased by 1.

Although both BWT and IC are invertible transformations with the correct key, they cannot be inverted with certain incorrect keys. This is true for a substantial number of perturbations, including certain small perturbations described above. It does not seem feasible to determine theoretically if a particular perturbation of the correct key results in noninvertibility. In any case, when either BWT or IC cannot be inverted with a particular incorrect key, the attacker can garner no information about the original plaintext.

To demonstrate the key sensitivity of our algorithm on image files, four well-known images in FIGS. 3-11 were processed. The visual differences between an original image and a decrypted image with a wrong key were quantified using the two standard metrics, peak signal-to-noise ratio (PSNR) and structural similarity index (SSIM).

FIG. 3 is an exemplary image of an Original Kodak01 image 50 (768×512). Image 52 is the decrypted image obtained by swapping the (33, 34) entries of the correct key. The encrypted image 52 (after BWT+Inversion) when decrypted with swap perturbation of (33, 34) entries of the correct key (inversion frequency vector). The decrypted image 54 is decrypted with ±1 perturbation of two adjacent entries of the correct key. The decrypted image 54 generated by increasing the $33^{rd}$ entry of the key by 1 and decreasing the $34^{th}$ entry by 1.

The table contains the PSNR and SSIM values of the RGB channels of the original image versus. the decrypted images with swap and ±1 perturbations of the correct key. As can be seen in the same figure, the PSNR and SSIM values of the original image, as against the ones decrypted with perturbed keys are too low to reveal any recognizable features of the original image in the wrongly decrypted ones.

Figure 4:
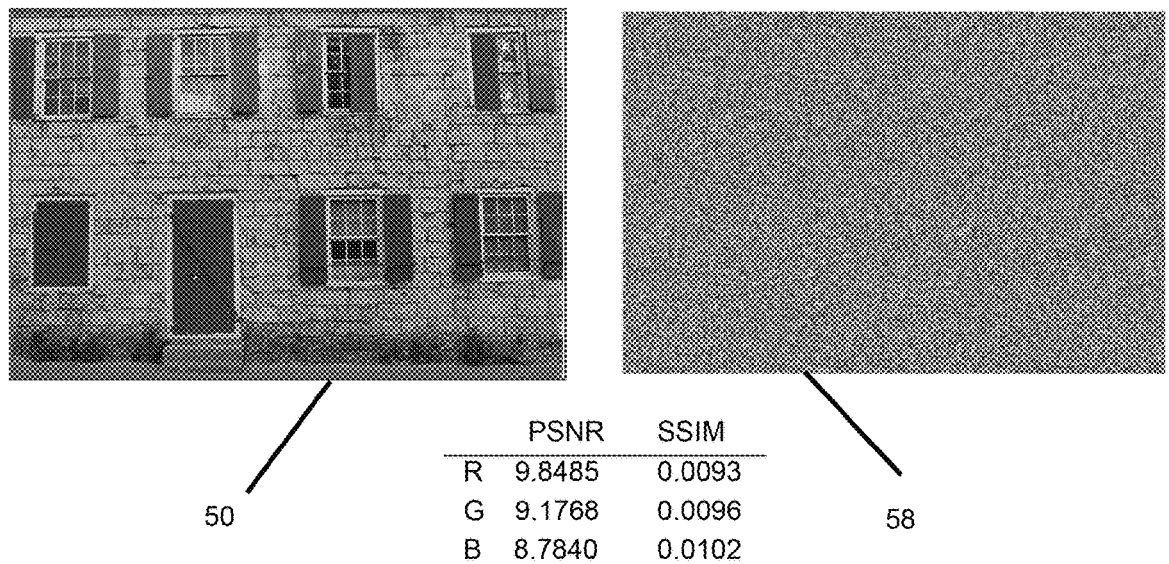
FIG. 4 is an exemplary image illustrating a generated random image of the same size of the image of FIG. 3, with a computed the PSNR and SSIM values of the original versus the random image.

FIG. 4. is an exemplary image illustrating the original image 50 and a random image 58 of the same size as image 50. The table contains the PSNR and SSIM values of image 50 as against the random image 58.

Figure 5:
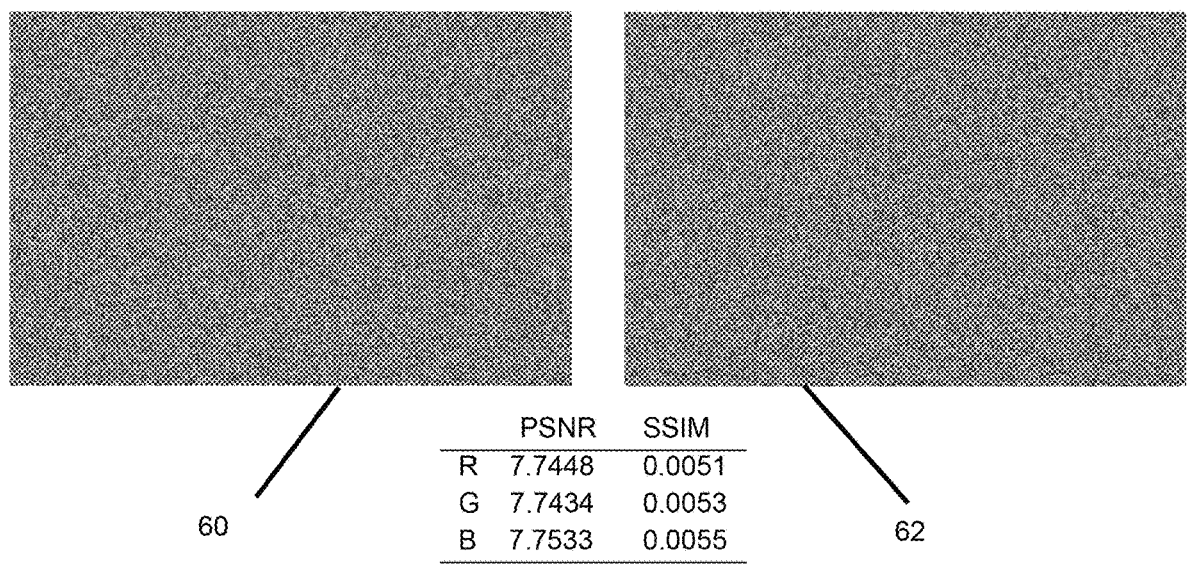
FIG. 5 illustrates two randomly generated images of the size of the image of FIG. 3, with a table containing PSNR and SSIM values of the two random images.

FIG. 5. illustrates two randomly generated images 60,62 of the size of the image 50 of FIGS. 3 and 4, with a table containing PSNR and SSIM values of the two random images. As an additional point of reference, in FIG. 5, similar results are reported between two random images 60,62 of the size of image 50. The values of the PSNR and SSIM in FIG. 4 are comparable to those among the random images in FIG. 5. Similar results occurred with similar experiments with the images of FIGS. 6-11.

Figure 6:
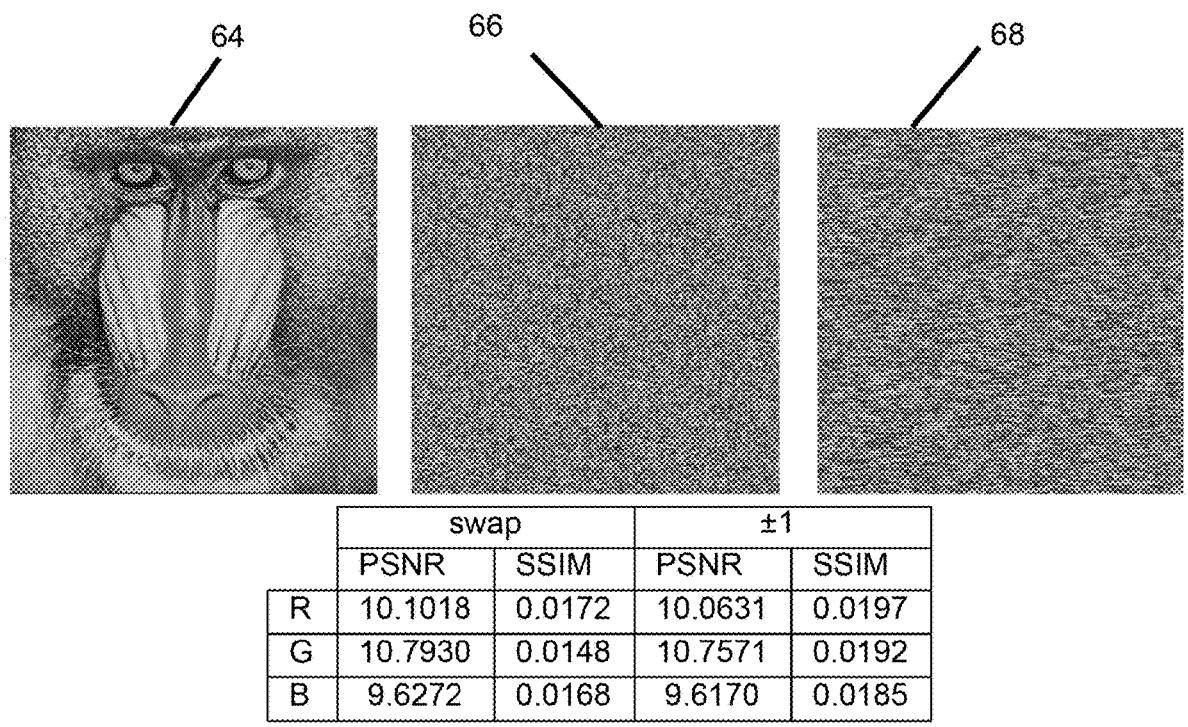
FIG. 6 is an exemplary image of a Mandrill, decrypted with a swap perturbation of the correct key, and decrypted with a ±1 perturbation of the correct key.

FIG. 6 is an exemplary image 64 of a Mandrill (512×512). The second image 66 is image 64 decrypted with a swap perturbation of the correct key. The third image 68 is image 64 decrypted with a ±1 perturbation of the correct key. The table contains the PSNR and SSIM values of the original image versus. the decrypted images with swap and ±1 perturbations of the correct key.

Figure 7:
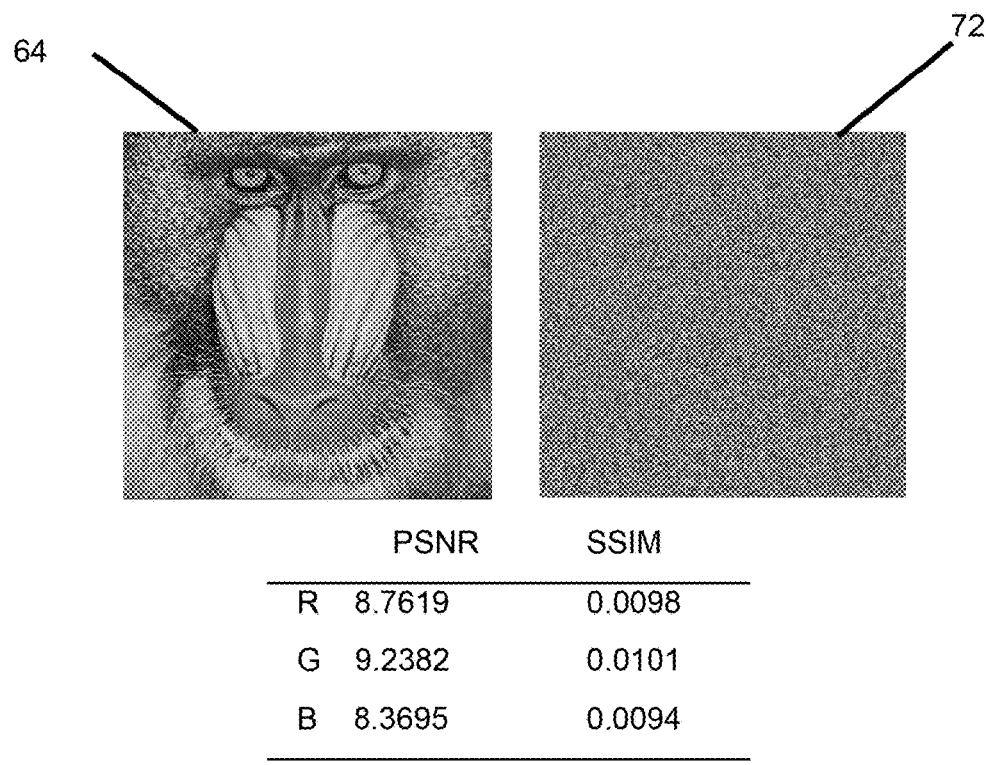
FIG. 7 illustrates the Mandrill image of FIG. 6, with a random image of the same size as Mandrill. The table contains the PSNR and SSIM values of Mandrill vs. the random image.

FIG. 7 illustrates the original Mandrill image 70 of FIG. 6 (image 64), with a random image 72 of the same size as Mandrill image 64. The table contains the PSNR and SSIM values of Mandrill versus the random image 72.

Figure 8:
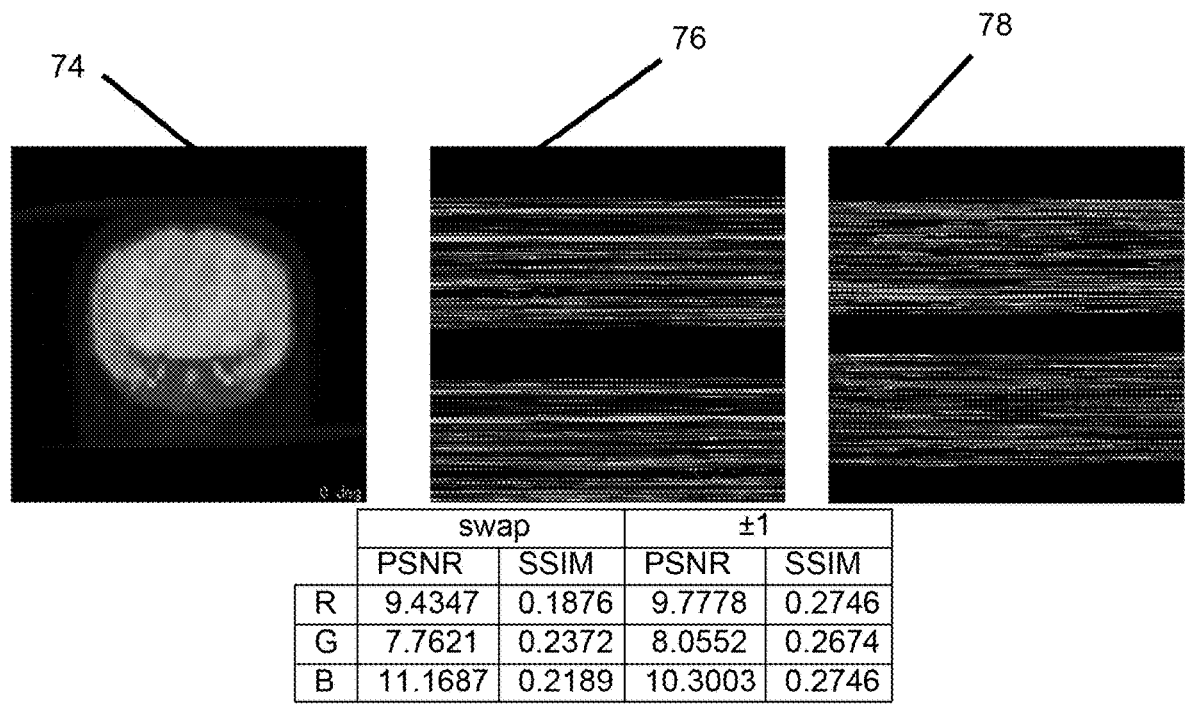
FIG. 8 illustrates an original pet-scan image, decrypted with a swap perturbation of the correct key, and decrypted with a ±1 perturbation of the correct key.

FIG. 8 illustrates an original pet-scan image 74 (256× 256), with a decrypted image 76 with a swap perturbation of the correct key. The third image 78 is decrypted with a ±1 perturbation of the correct key. The table contains the PSNR and SSIM values of the original image 74 versus the decrypted images with swap 76 and ±1 perturbations (image 78) of the correct key.

Figure 9:
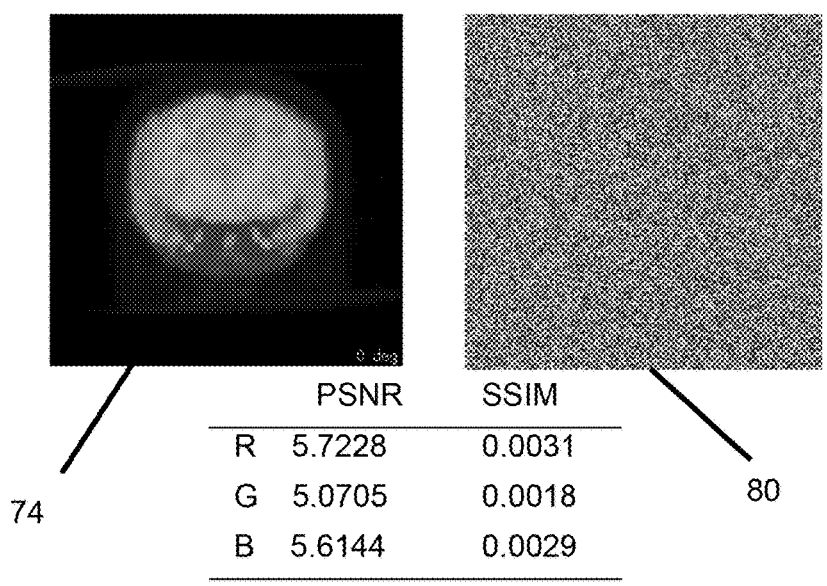
FIG. 9 illustrates the pet-scan image of FIG. 8, with a random image of the same size as the original image.

FIG. 9. Illustrates the pet-scan image 74 of FIG. 8, with a random image 80 of the same size as image 74. The table contains the PSNR and SSIM values of the pet-scan image 74 versus the random image 80.

Figure 10:
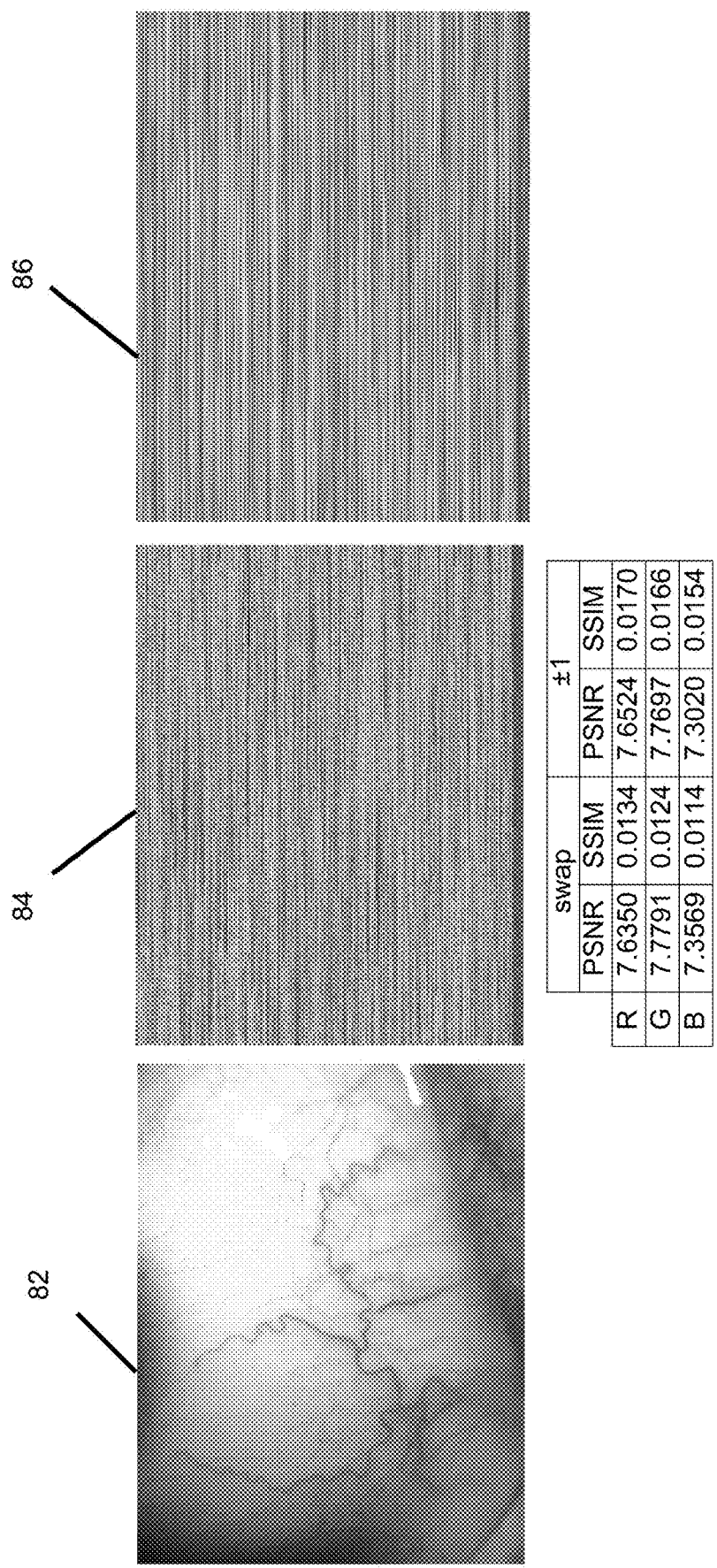
FIG. 10 illustrates an eye image, a decrypted image with a swap perturbation of the correct key, and a decrypted image with a ±1 perturbation of the correct key.

FIG. 10 illustrates an eye image 82 (3216×2136), with a decrypted image 84 with a swap perturbation of the correct key, and a decrypted image 86 with a ±1 perturbation of the correct key. The table contains the PSNR and SSIM values of the original image 82 versus the decrypted images with swap (image 84) and ±1 perturbations of the correct key (image 86).

Figure 11:
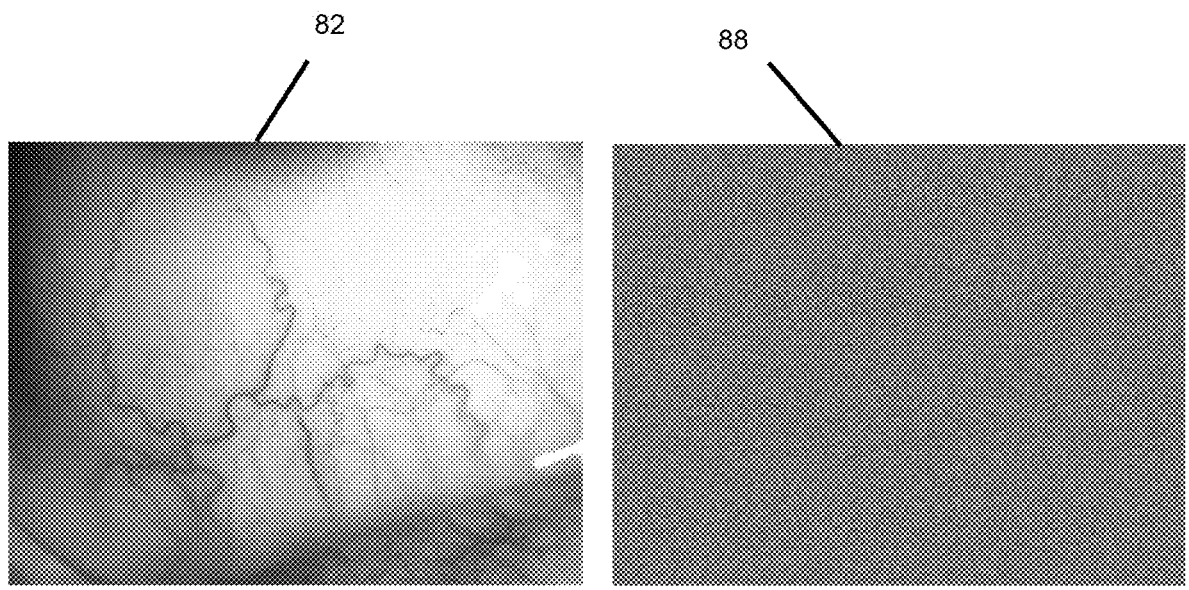
FIG. 11 illustrates the eye image of FIG. 10, with a random image of the same size as the eye image.

FIG. 11 illustrates the original eye image 82 of FIG. 10, with a random image 88 of the same size as eye image 82. The table contains the PSNR and SSIM values of eye image 82 versus the random image 88.

It should be evident from the foregoing figures that even the smallest possible change in a correct key value results in an entirely different decrypted image than the original one. The PSNR and SSIM values demonstrate that the decrypted images are comparable to randomly generated images.

To demonstrate the key sensitivity of the present algorithm on audio files, we used speech signals in American English that are recommended by the International Telecommunication Union (ITU) for speech transmission testing. As we have already indicated, testing for key sensitivity for our algorithm amounts to demonstrating that decryption of ciphertext with keys that are arbitrarily close to the correct key should not reveal any recognizable feature of the original plaintext. This entails measuring the differences between two audio files. There are various commonly used metrics for this purpose, e.g., waveform plotting, spectral similarity analysis, Pearson Correlation, Mean Square Error (MSE), Unified Average Changing Intensity (UACI), etc.

Figure 13:
FIG. 13 illustrates a series of images after BWT+Inversion, with histograms of after BWT+Inversion.
Figure 13:
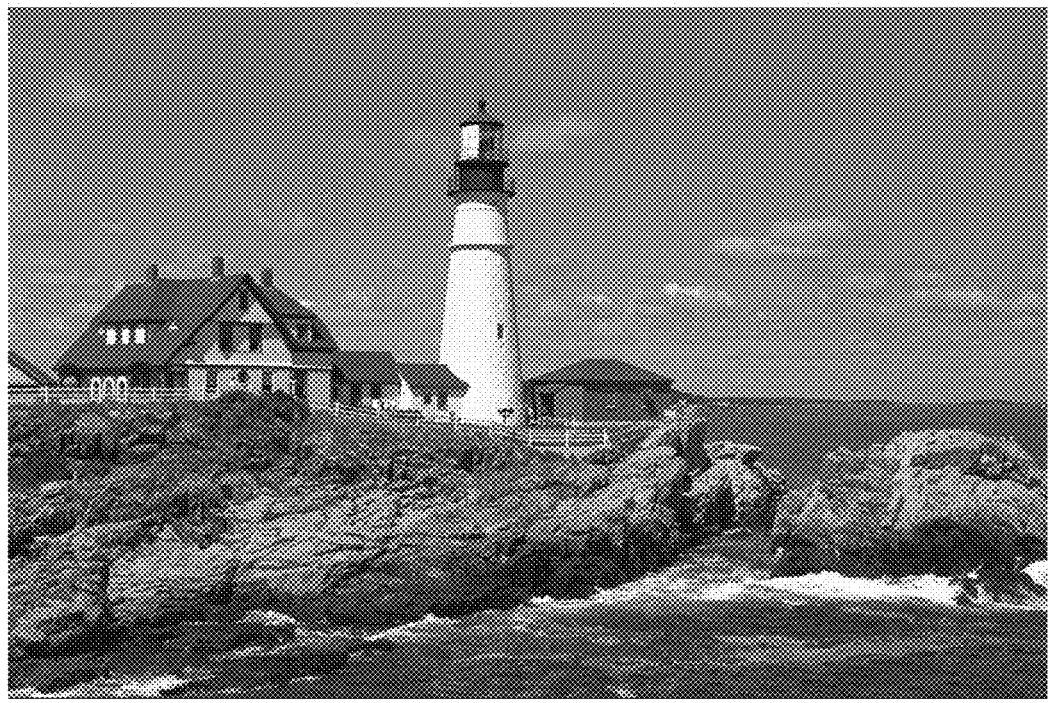
Figure 13:
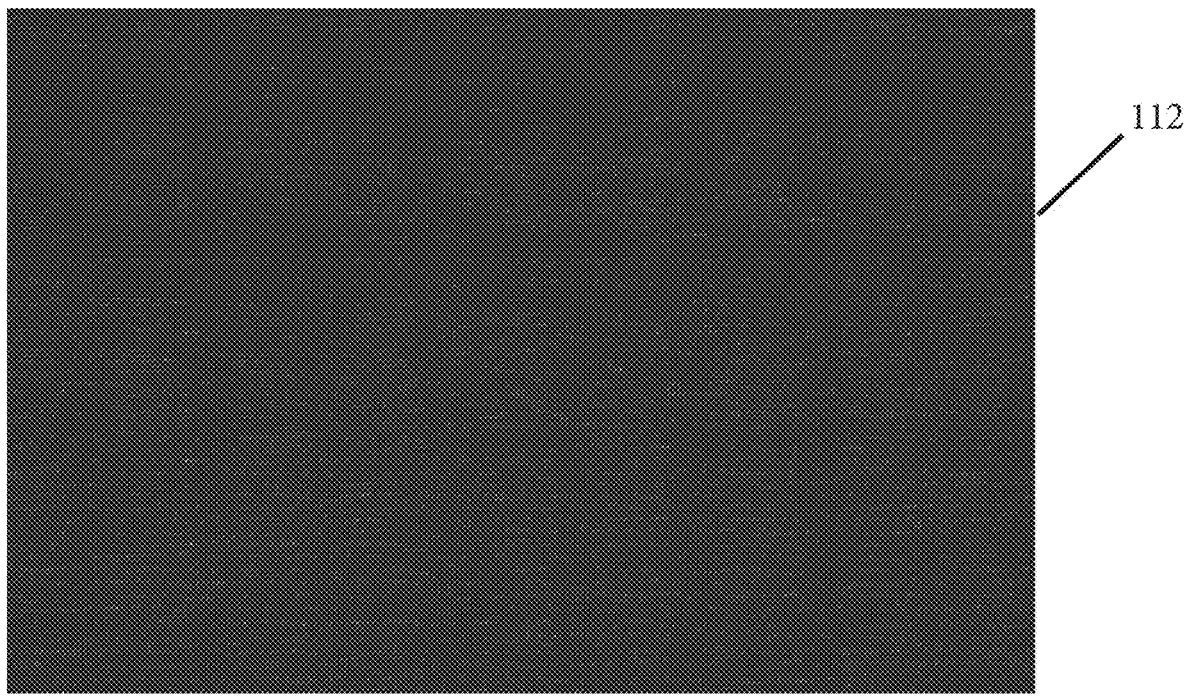
Figure 13:
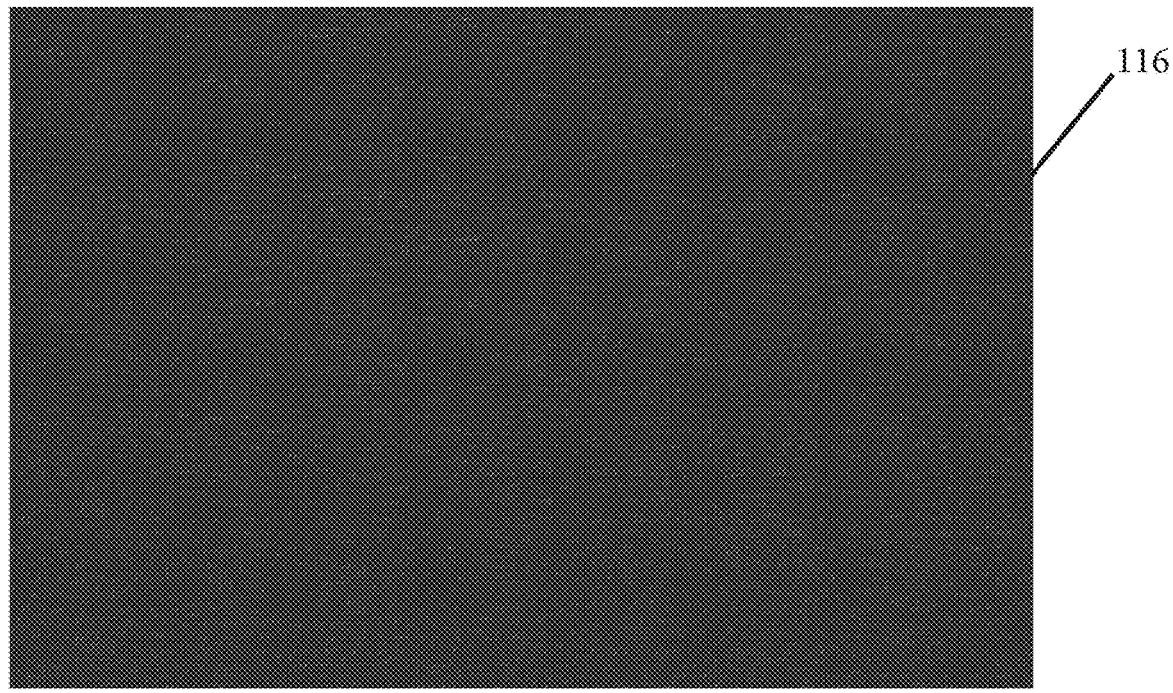
Figure 13:
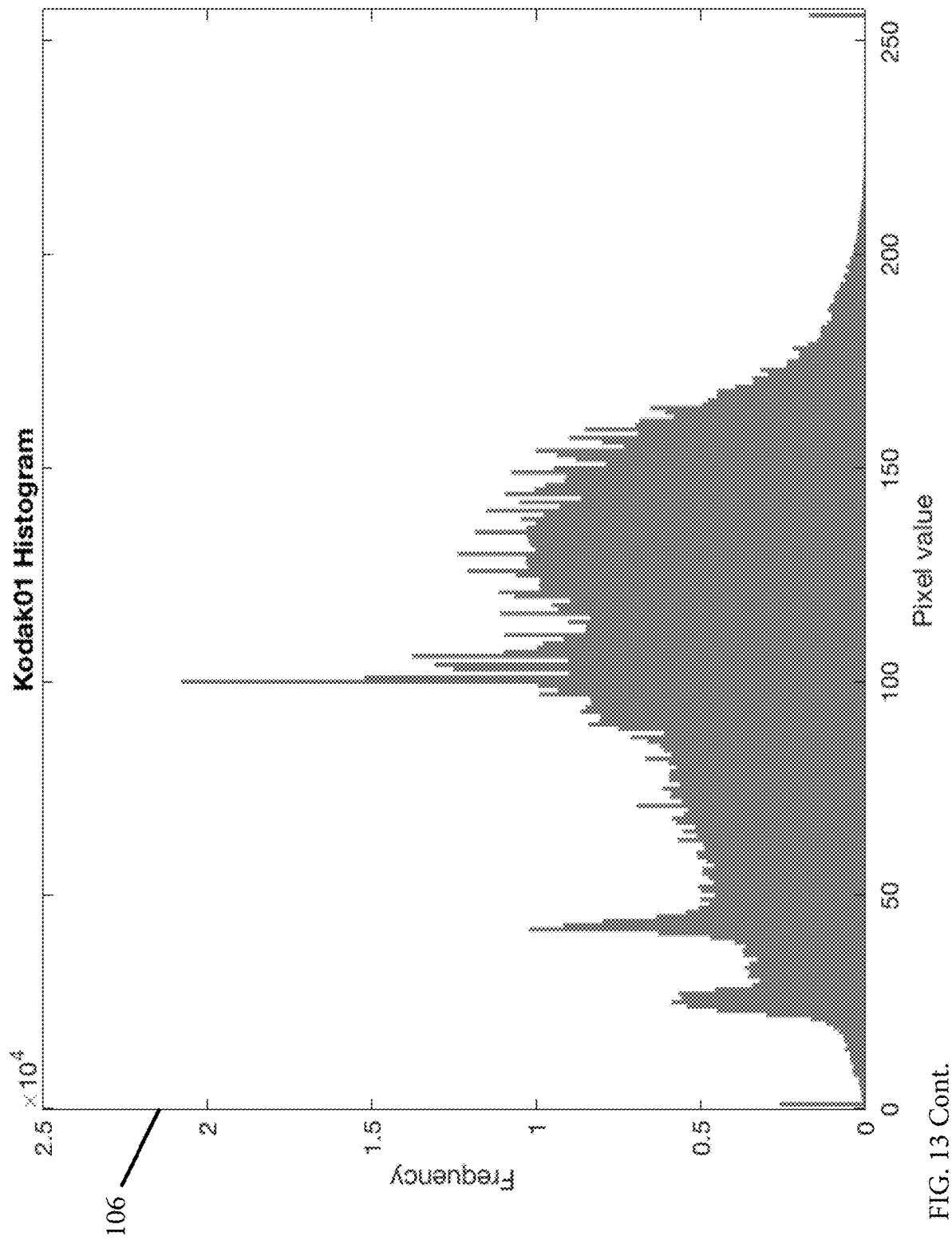
Figure 13:
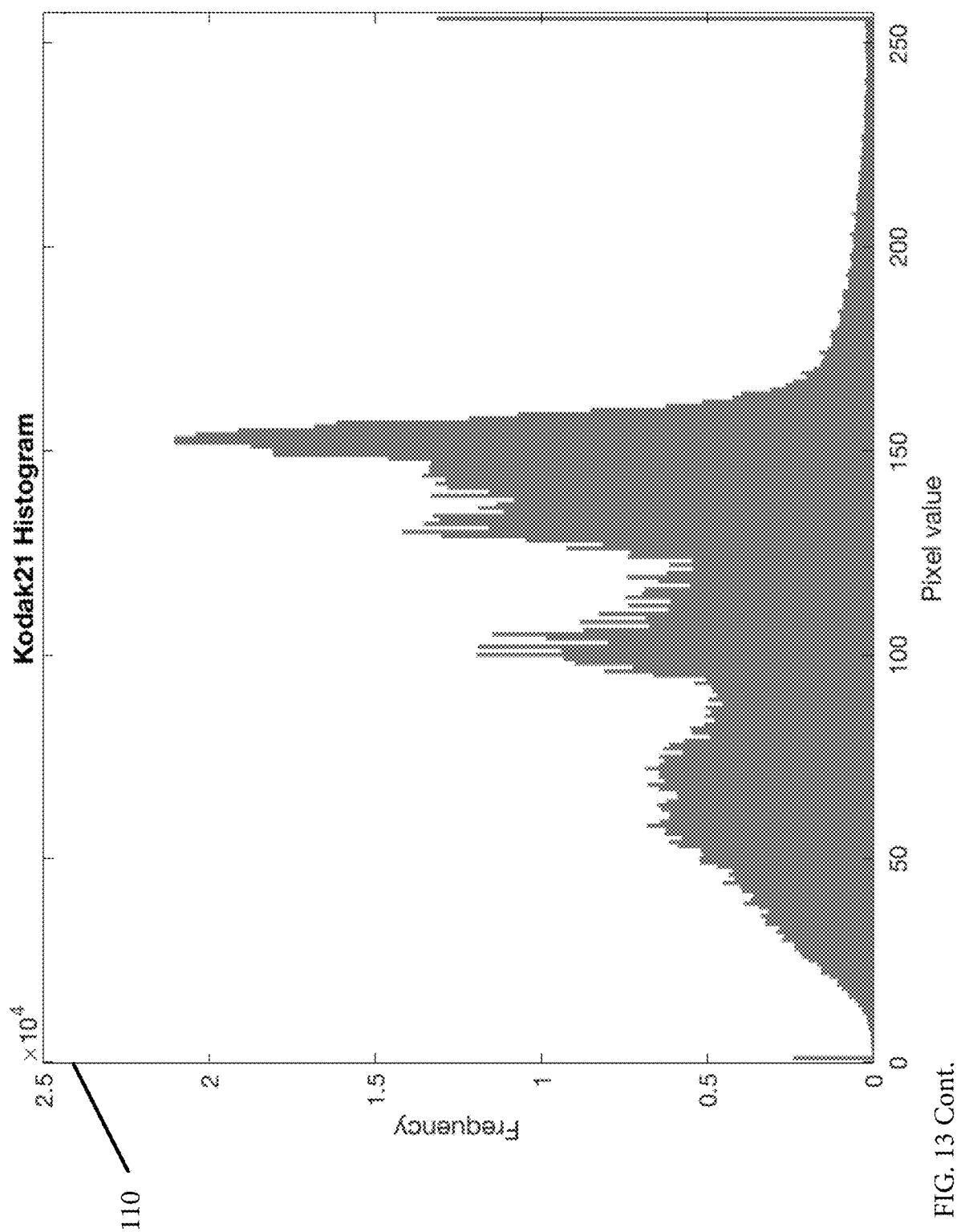
Figure 13:
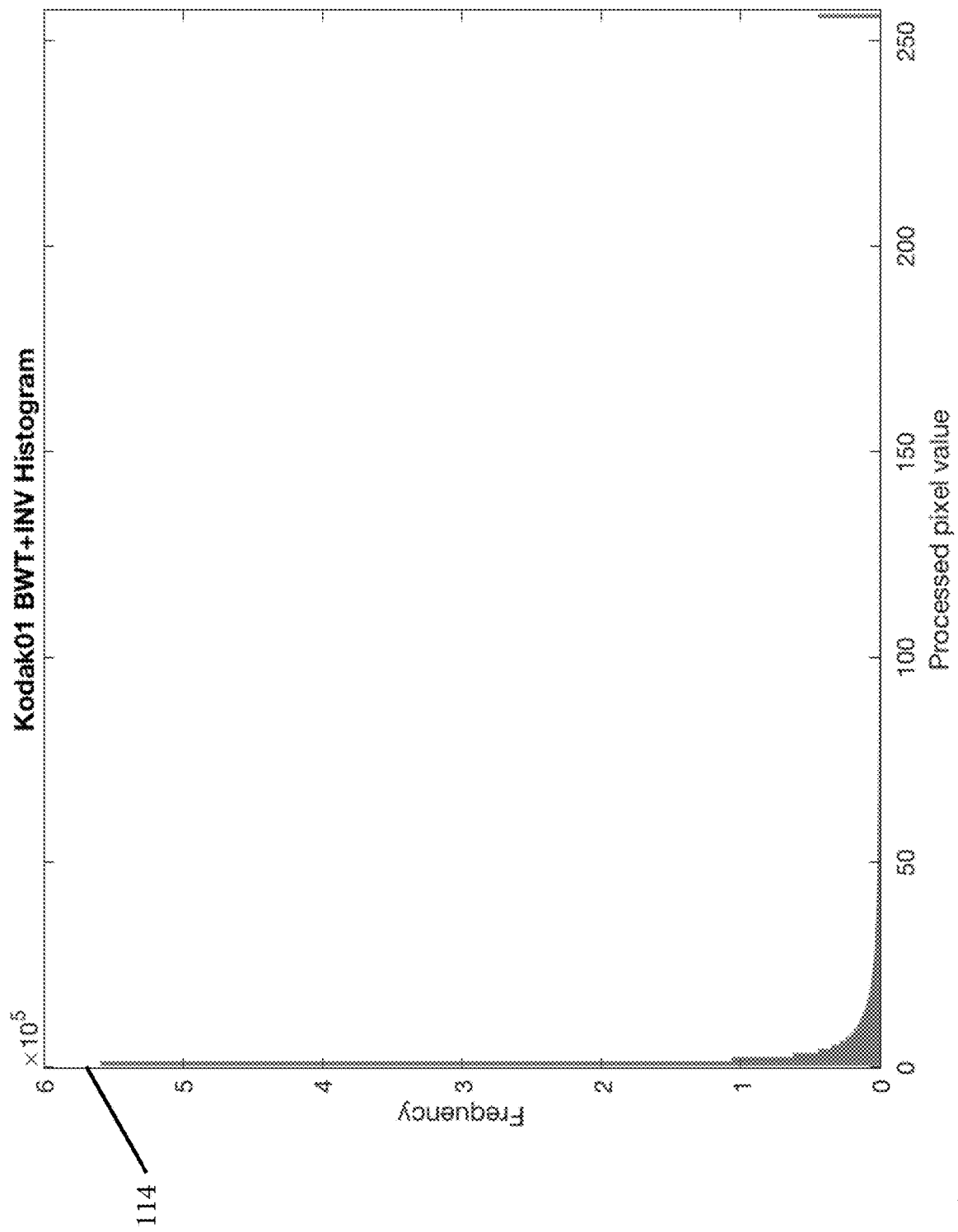
Figure 13:
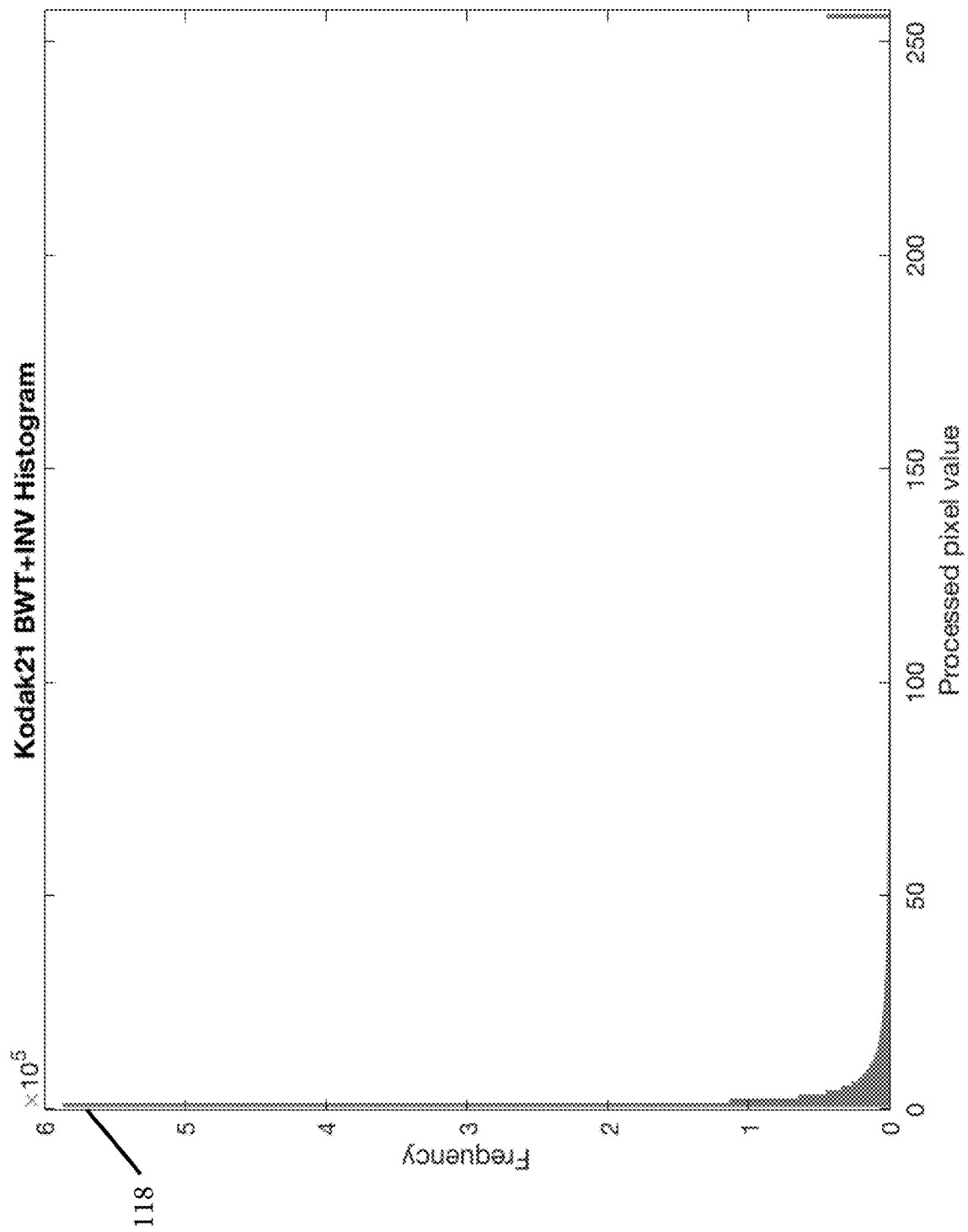

FIG. 13 illustrates an original audio signal 90 (A_eng_m5.wav) and its spectrogram 92. The audio signal 90 is decrypted with swap, as shown at graph 94, with spectrogram 96. Then the audio file 90 is decrypted with a ±1 perturbation, shown at graph 98, with its spectrogram 100. The table 102 contains the Pearson Correlation and MSE values of the original signal and the decrypted signal with the wrong keys (correct key altered by swap or ±1 of indices 18 and 19).

Figure 12:
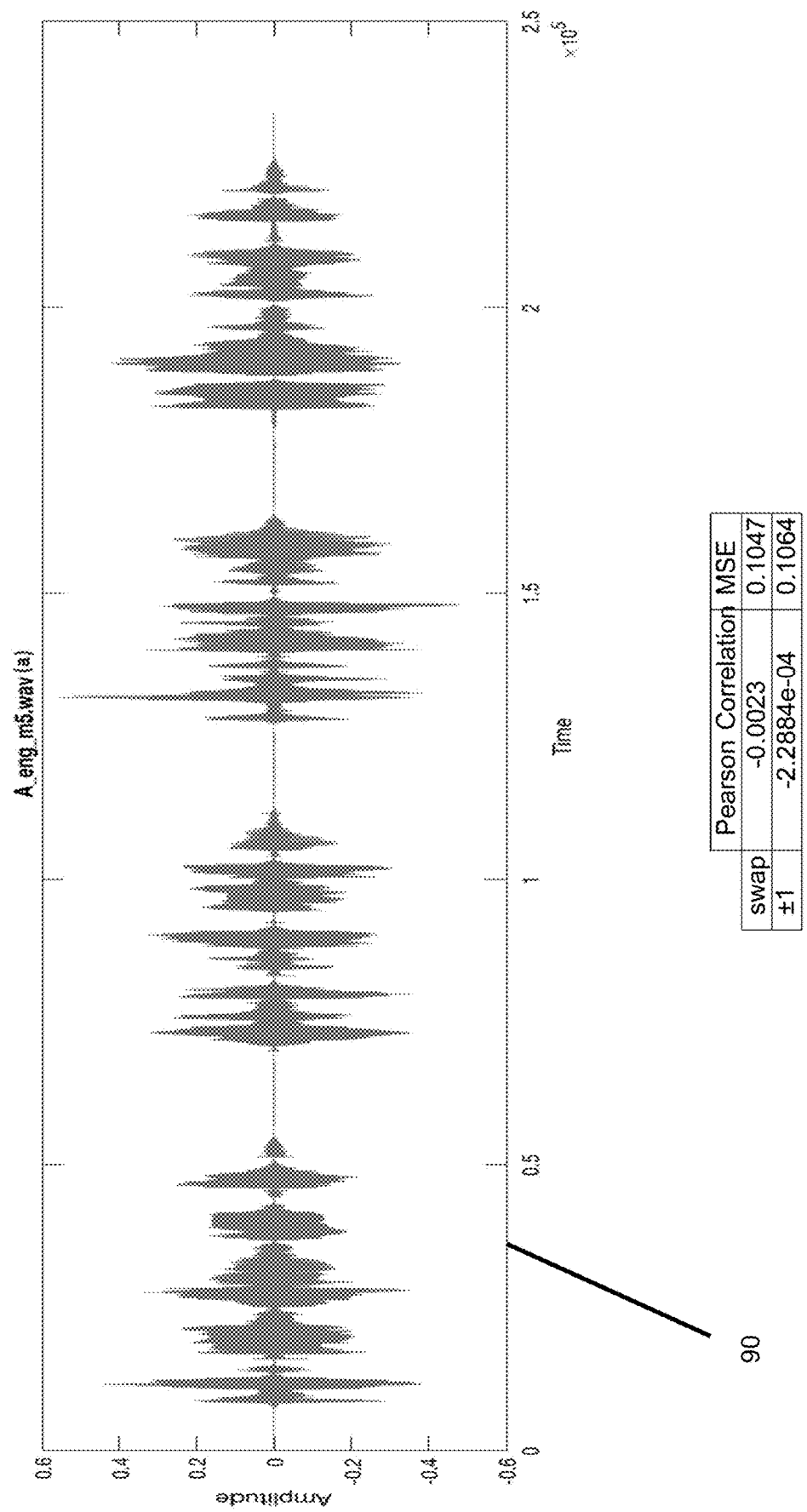
FIG. 12 Is a graph of an audio signal with its spectrogram, with the audio signal decrypted with swap, and then decrypted with ±1 perturbation.
Figure 12:
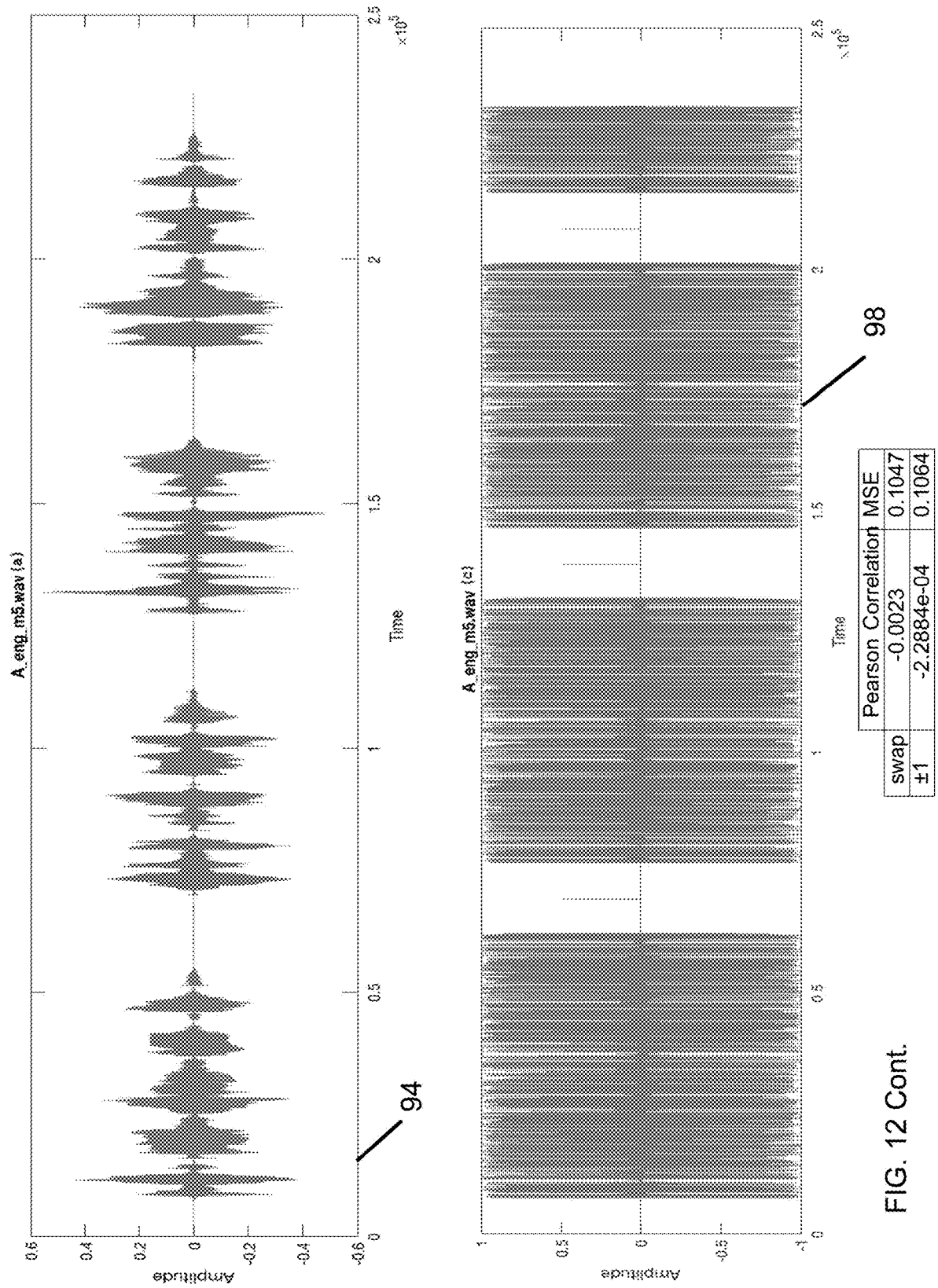
Figure 12:
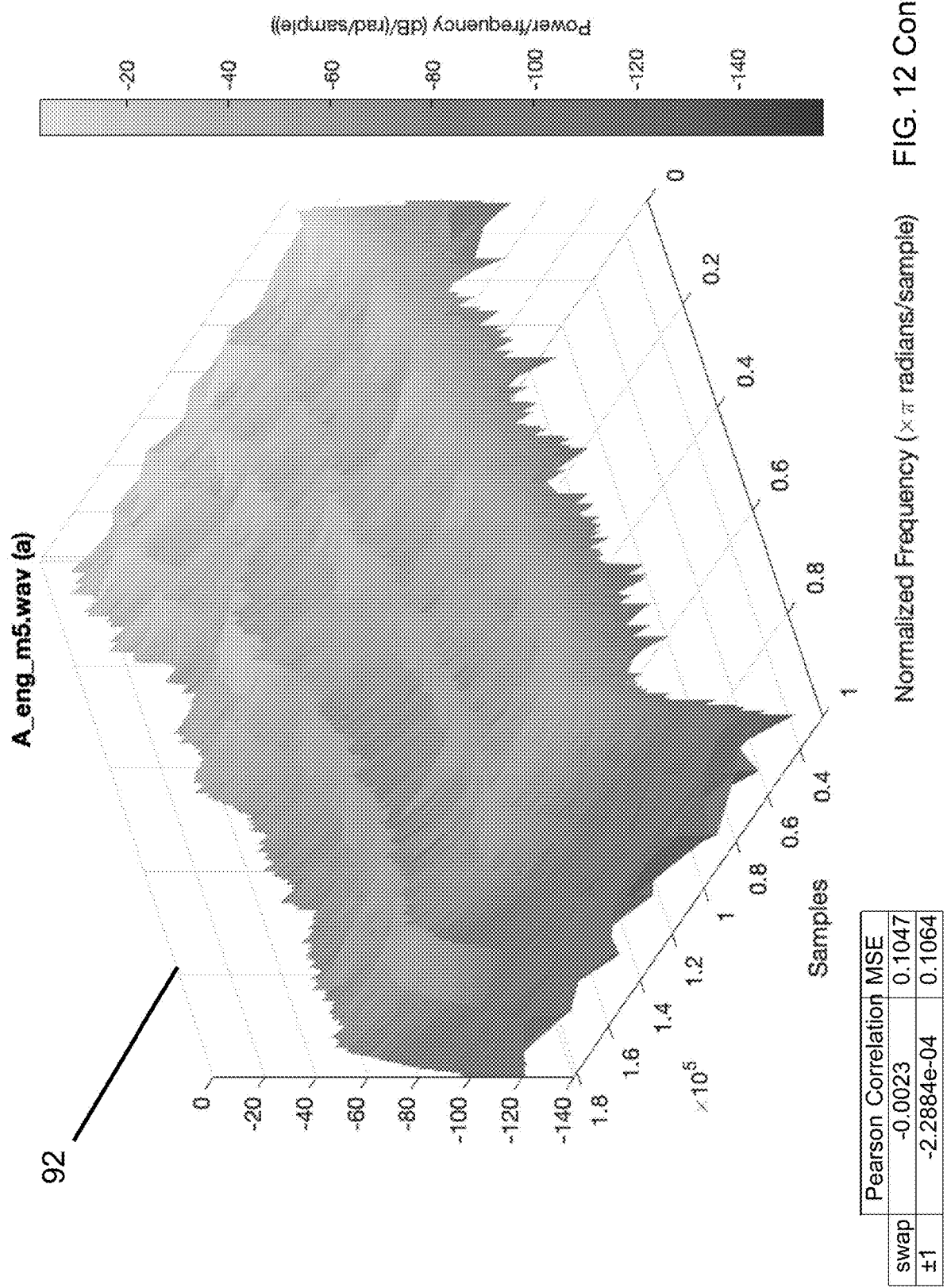
Figure 12:
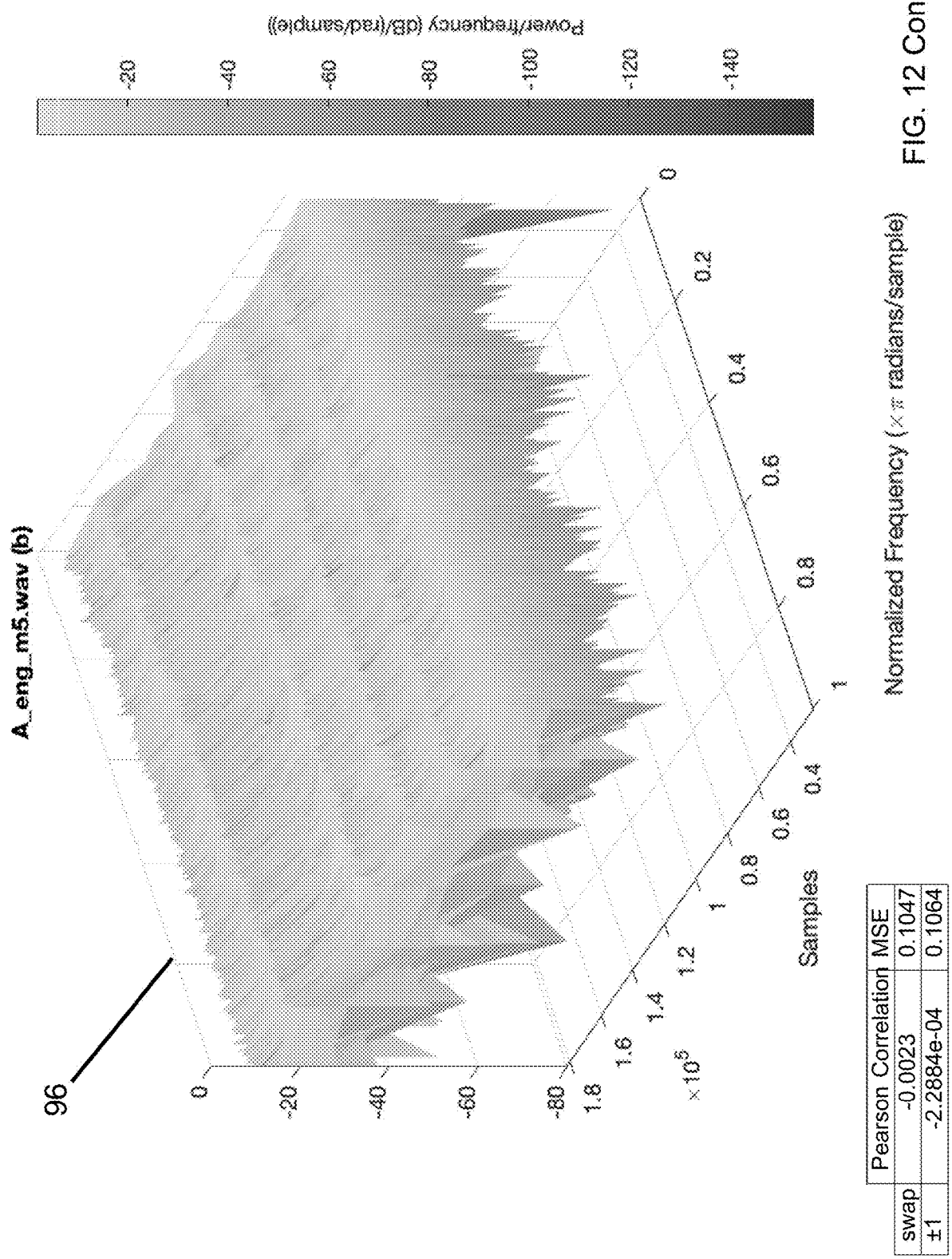
Figure 12:
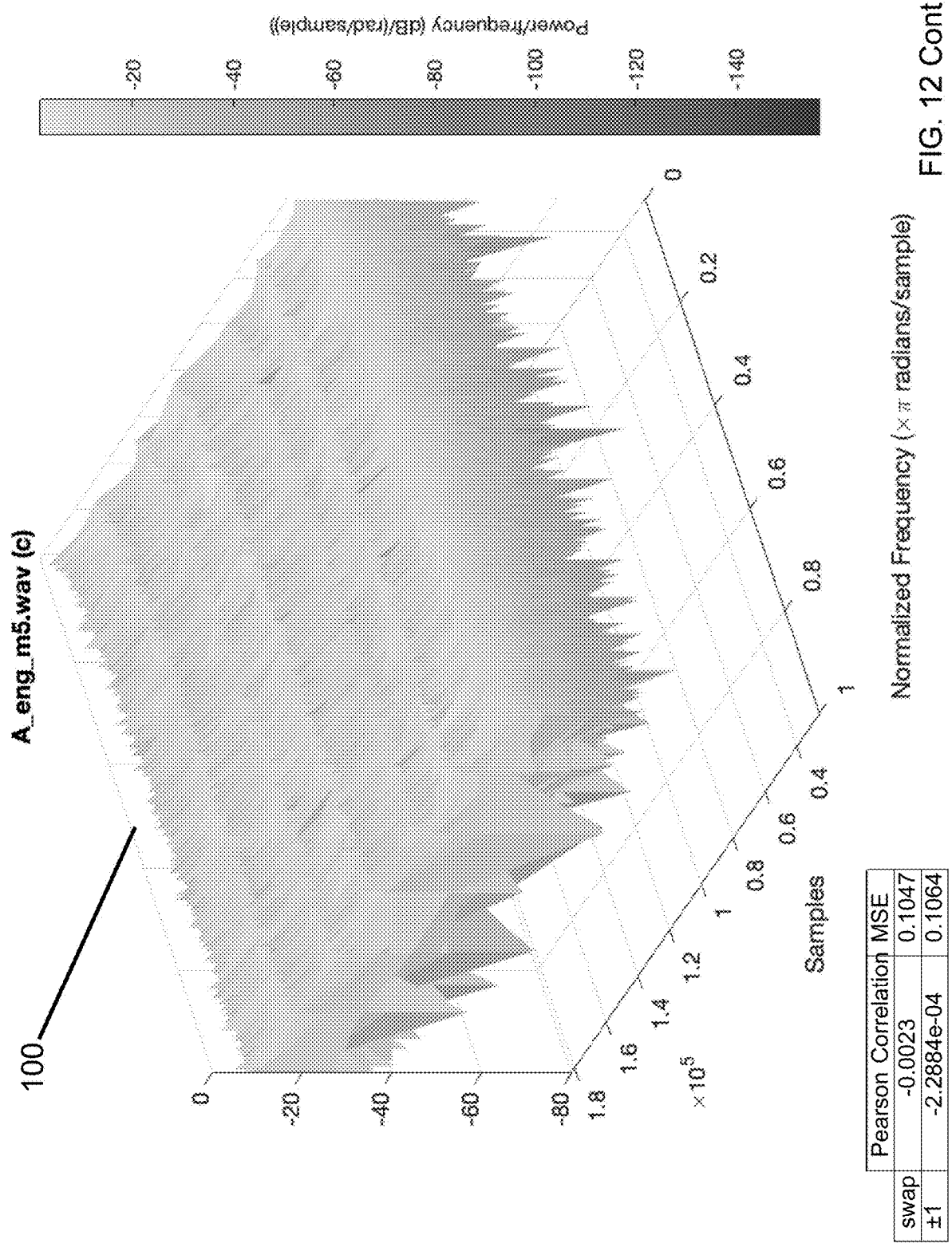

Here, the key sensitivity test of our algorithm on the audio file A_eng_m5.wav (ITU test speech in American English by a male speaker) uses four metrics: waveform, spectrogram, Pearson Correlation, and MSE. In FIG. 13, the time series and spectrograms of an original audio files (A_eng_m5.wav) and its decrypted time series and spectrograms with two different small alterations of the correct key are plotted. The quantified the visible differences among the files using the Pearson Correlation and MSE values as tabulated table 102 in FIG. 12. The extremely small values of these metrics validate the key sensitivity of the present algorithm on the encryption of the original audio file.

The "histogram" of a file is simply the distribution of the symbols in that file. A histogram attack is one of the most commonly used statistical model-based attacks in which the attacker attempts to predict relationships of some data segments between the original and the encrypted data from the distribution measures. The present algorithm of the system and method is resistant to histogram attacks, as demonstrated by an attack on image files. The Histogram analysis of our test audio files in Table 3 yielded experimental results similar to those for images.

Figure 14:
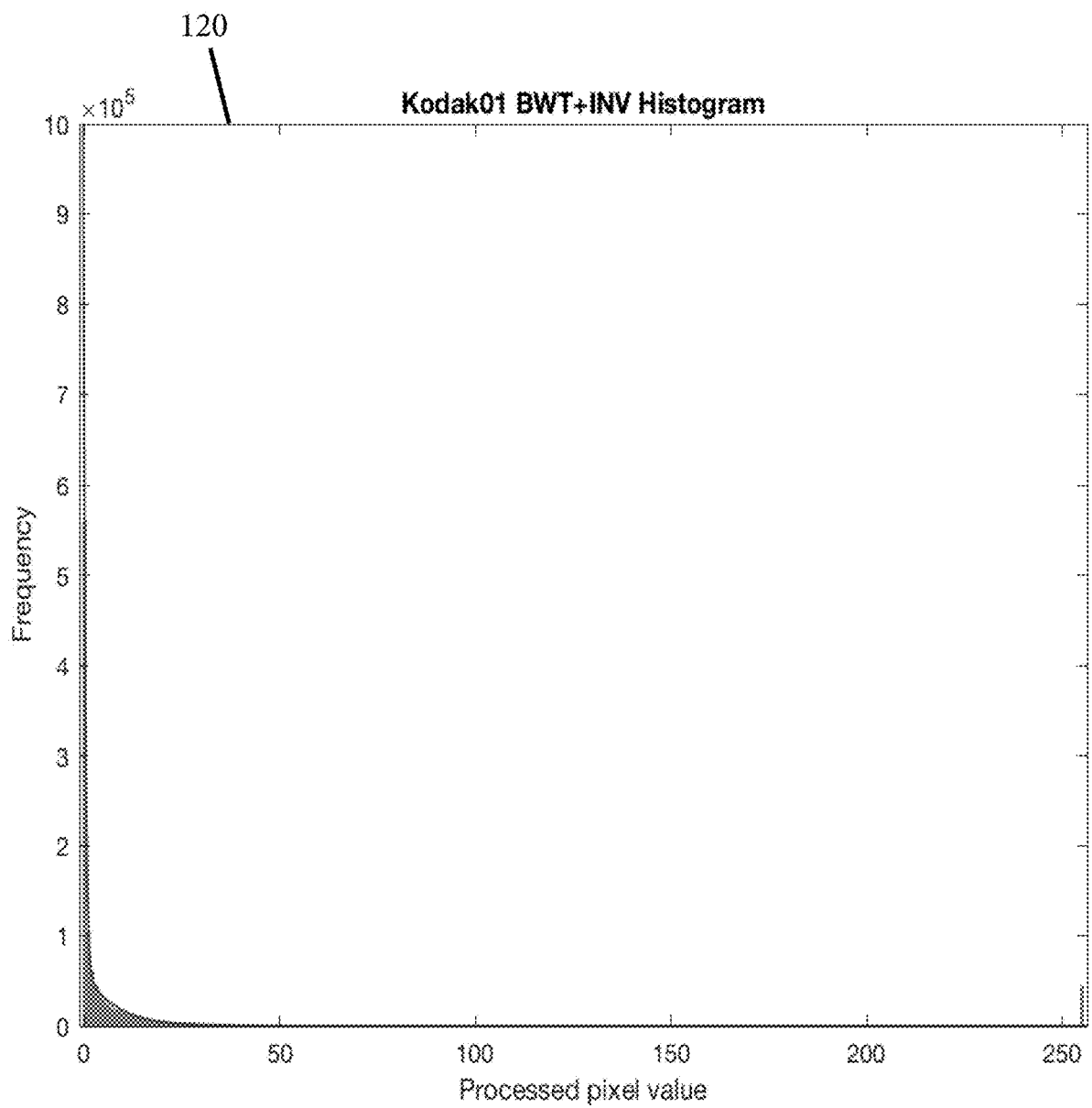
FIG. 14 illustrates coefficients of double exponentiation using non-linear curve fitting algorithm Exp2 of MATLAB for the histograms of image files after BWT+Inversion.
Figure 14:
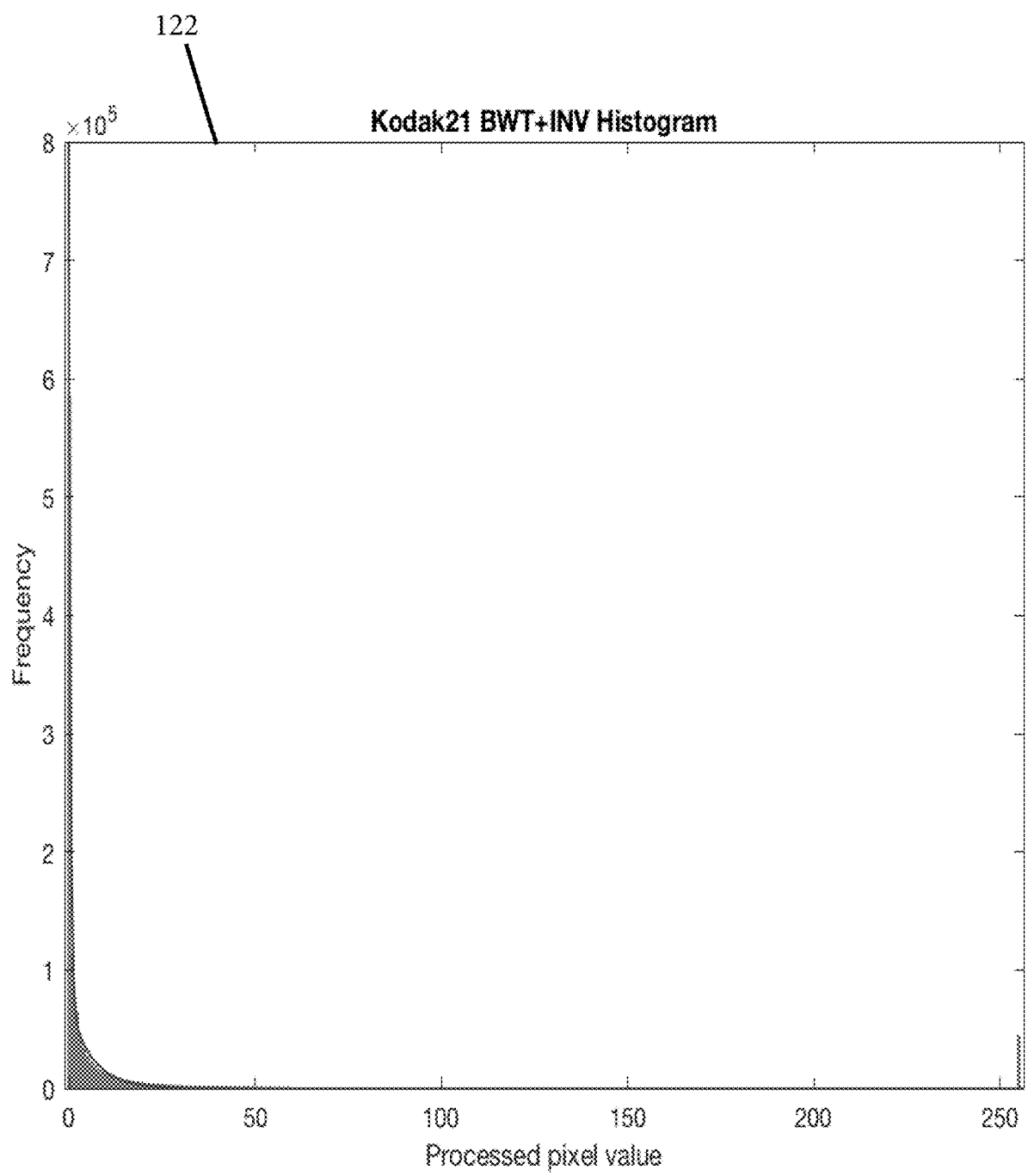

In FIG. 14, images 104 and 108 and their histograms 106 and 108 (collectively all RGB channels) are shown before and after encryption (BWT followed by IC) are displayed. It is evident that the histograms of the plain images and their corresponding encrypted versions have no similarities. FIG. 14 illustrates image 104 and image 108, histogram 106 for image 104 and histogram 110 for image 108, and the images after BWT+Inversion of image 112 (inversion of image 104), image 116 (inversion of image 108), and their respective histograms, histogram 114 of image 112, and histogram 118 of image 116.

In general, secure encryption is expected to randomize the input data, and thus the histogram of an encrypted image is expected to have a uniform distribution of pixel values. The present algorithm does not randomize the input data, but it introduces new values that can be much larger than the pixel values (0-255). However, the two histograms of encrypted images of two vastly different pictures appear to be nearly identical, compare histogram 114 with histogram 118. To quantify this visual observation, we used the nonlinear curve fitting algorithm Exp2 of MATLAB, which employs the double exponential function:

$$f(x)=ae^{bx}+ce^{dx}$$

with four parameters, a, b, c, and d. The resulting parameter values and the fitted nonlinear curves are depicted in FIG. 14.

FIG. 14 illustrates coefficients (with 95% confidence bounds) of double exponential $f(x)=ae^{bx}+ce^{dx}$ using nonlinear curve fitting algorithm Exp2 of MATLAB for the histograms 106 (graph 120) and histogram 110 (graph 122) after BWT+Inversion. The results are:

Kodak01: $a=4.972e+05(4.878e+05, 5.067e+05)$ $b=-2.224(-2.376,-2.071)$ $c=6.21e+04(5.477e+04, 6.943e+04)$ $d=-0.1313(-0.1483,-0.1143)$ Kodak21: $a=5.165e+05(5.055e+05, 5.275e+05)$ $b=-2.232(-2.392,-2.072)$ $c=7.027e+04(6.103e+04, 7.95e+04)$ $d=-0.1622(-0.1843,-0.1402)$ It is evident that the parameter values for the histograms of the encrypted two different images are indeed nearly identical. All the encrypted pictures in the set have similar histograms. Encryption of the other image sets used in this paper, as well as random images, also exhibit double exponential distributions, albeit with slightly different coefficients. Therefore, it is unlikely that a histogram attack can succeed in extracting meaningful information about image files encrypted with the present technique.

For a correlation analysis, adjacent pixels are often correlated in most images. To guard against statistical attacks, adjacent pixels of ciphered images must be decorrelated. The degree of correlation of adjacent pixels can be quantified with the Pearson correlation coefficient.

The Pearson correlation coefficient of two random variables A and B can be computed with the formula:

$$\rho(A, B) = \frac{1}{N-1}\sum_{i=1}^{N}\left(\frac{A_i - \mu_A}{\sigma_A}\right)\left(\frac{B_i - \mu_B}{\sigma_B}\right)$$

where $\mu_A$ and $\mu_B$ are the means and $\sigma_A$ and $\sigma_B$ are the standard deviation of the random variables. Equivalently, the correlation coefficients can be calculated with the covariance of A and B as:

$$\rho(A, B) = \frac{\text{cov}(A, B)}{\sigma_A \sigma_B}$$

The absolute value of the correlation coefficient ranges from 0 to 1, where 0 indicates complete decorrelation and 1 indicates total correlation, e.g. $\rho(A,A)=1$.

Figure 15:
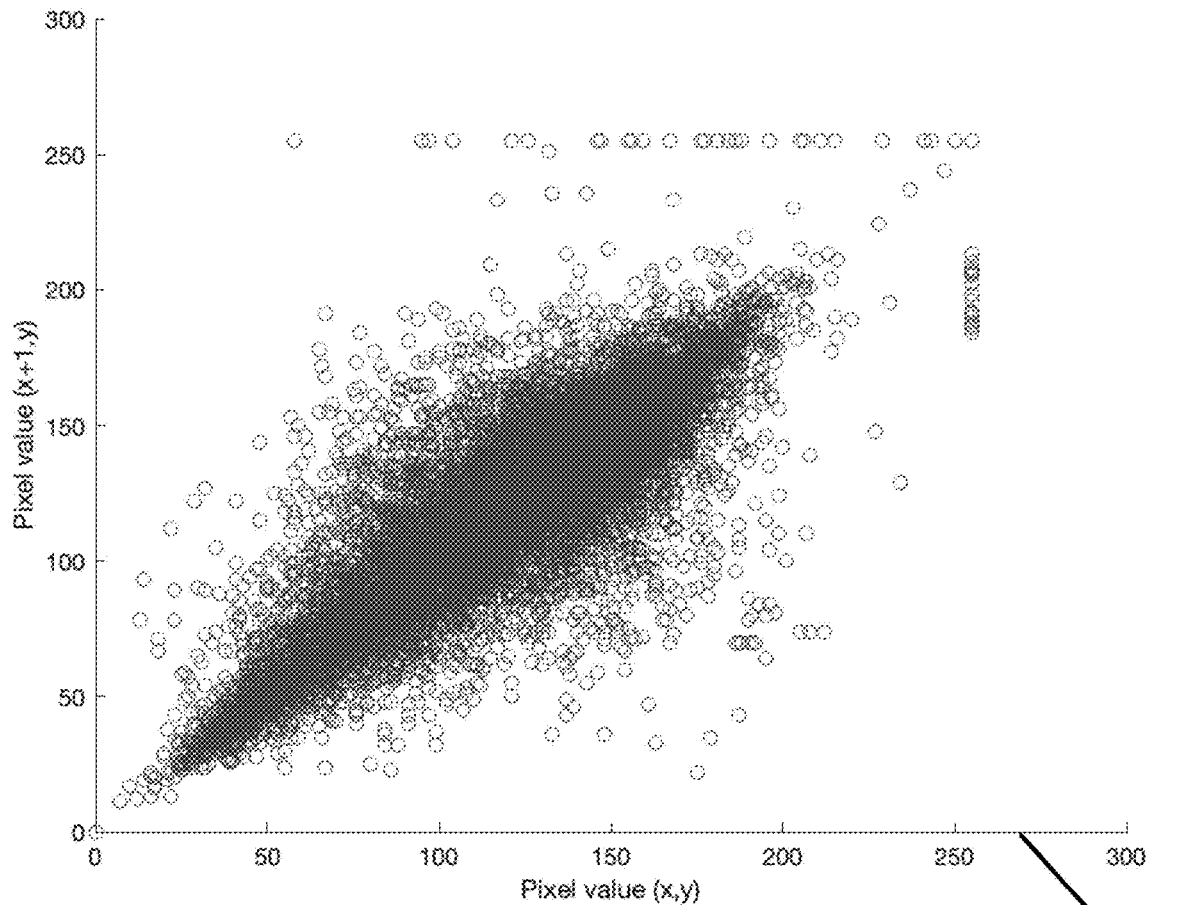
FIG. 15 illustrates six plots depicting the Pearson correlation charts (using horizontal neighbor to the right) of RGB channels of the original and ciphered images, with a table containing the correlation coefficients of four plain and cipher images of adjacent pixels on RGB channels.
Figure 15:
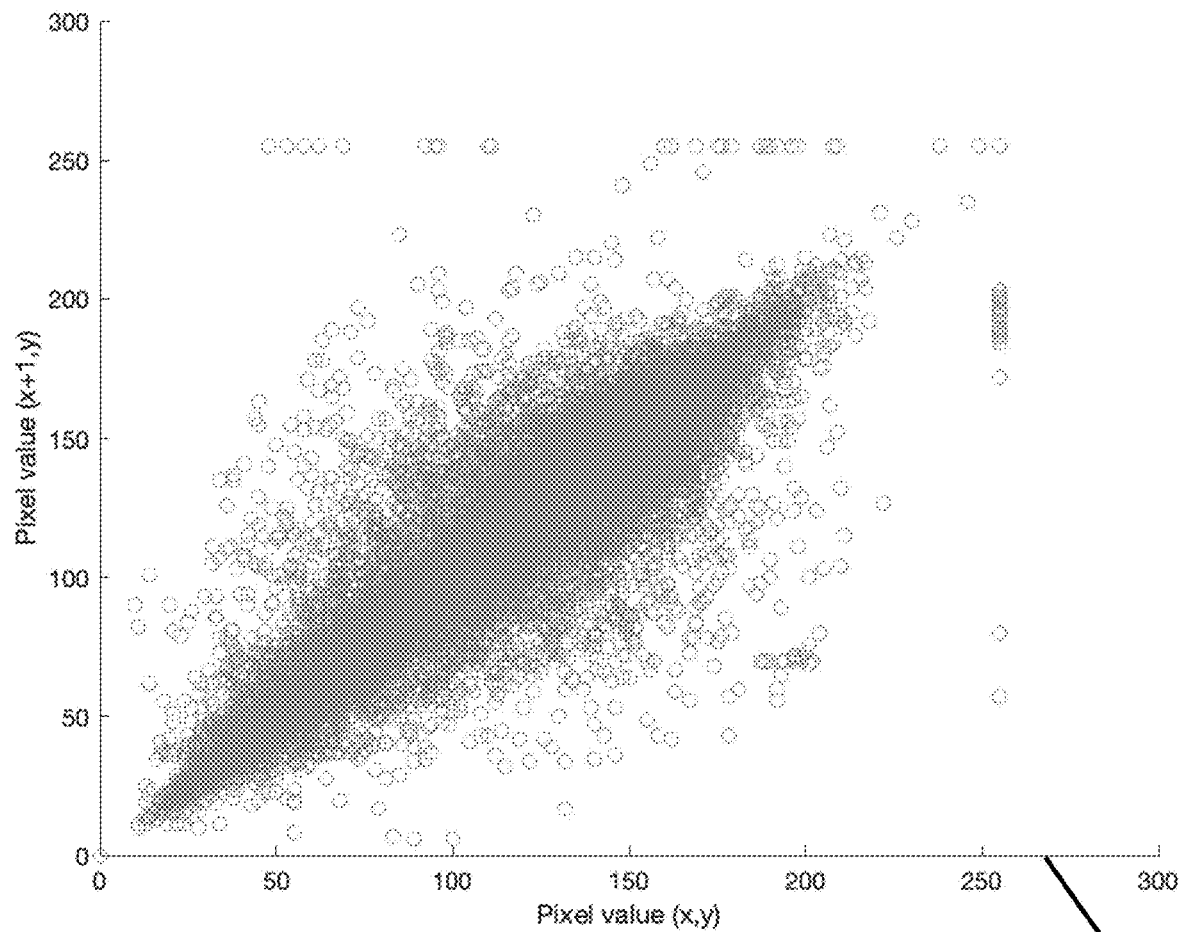
Figure 15:
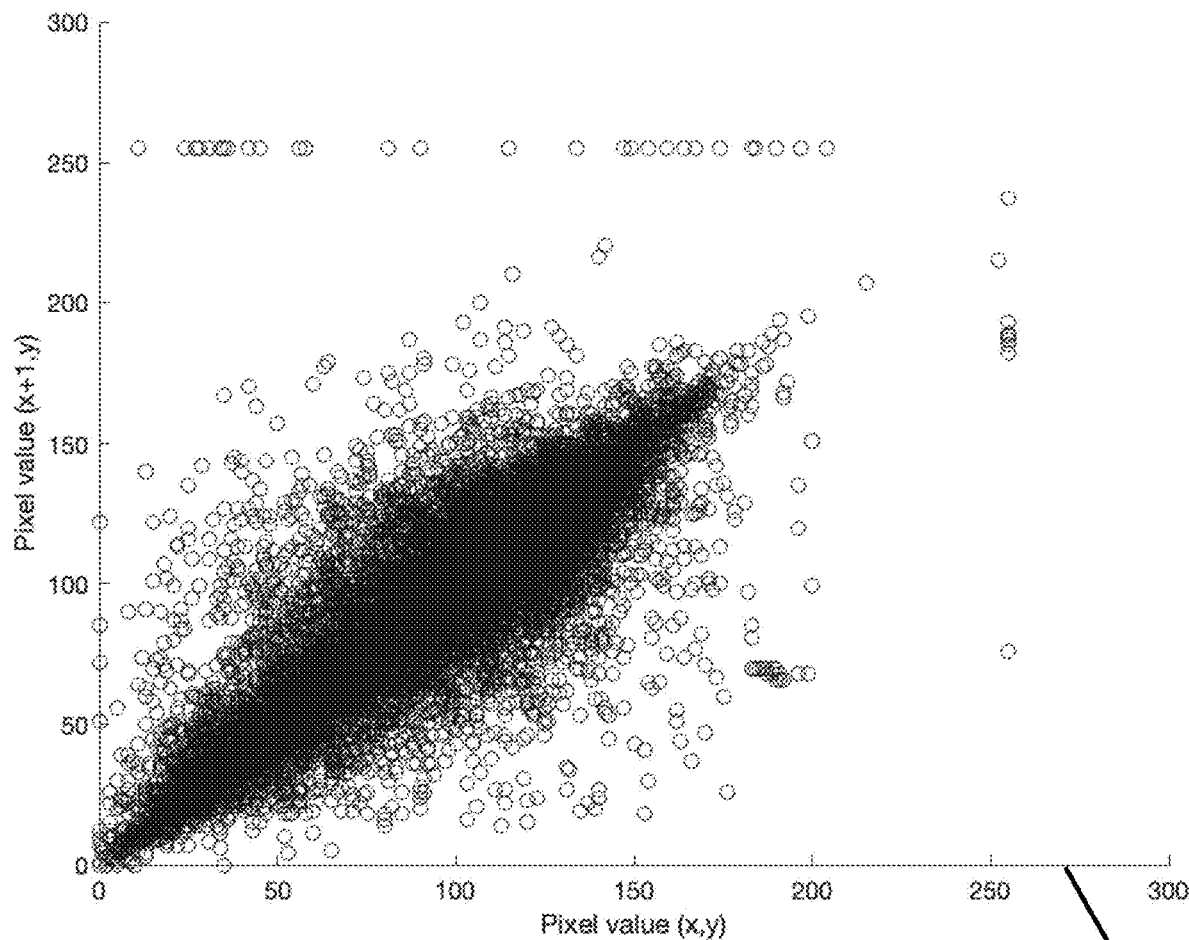
Figure 15:
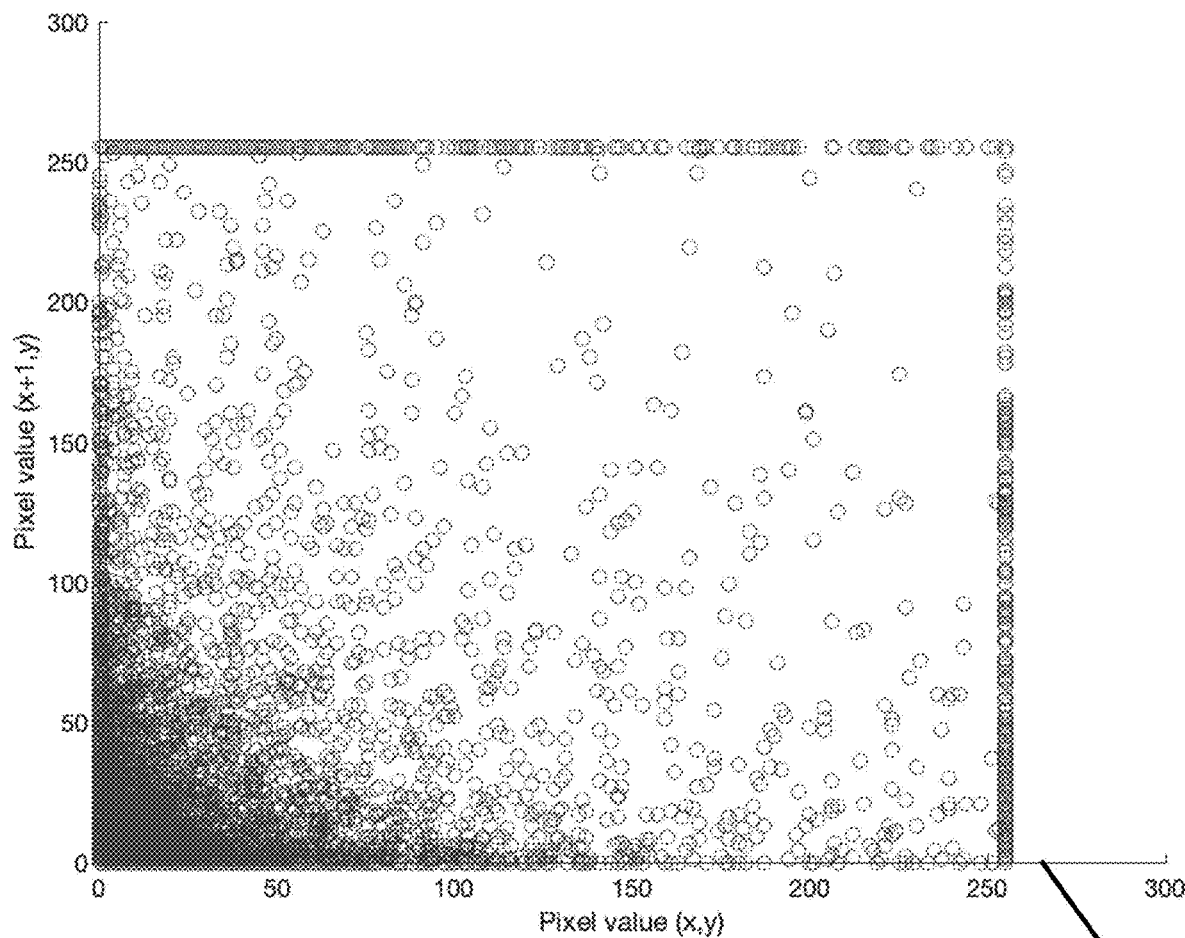
Figure 15:
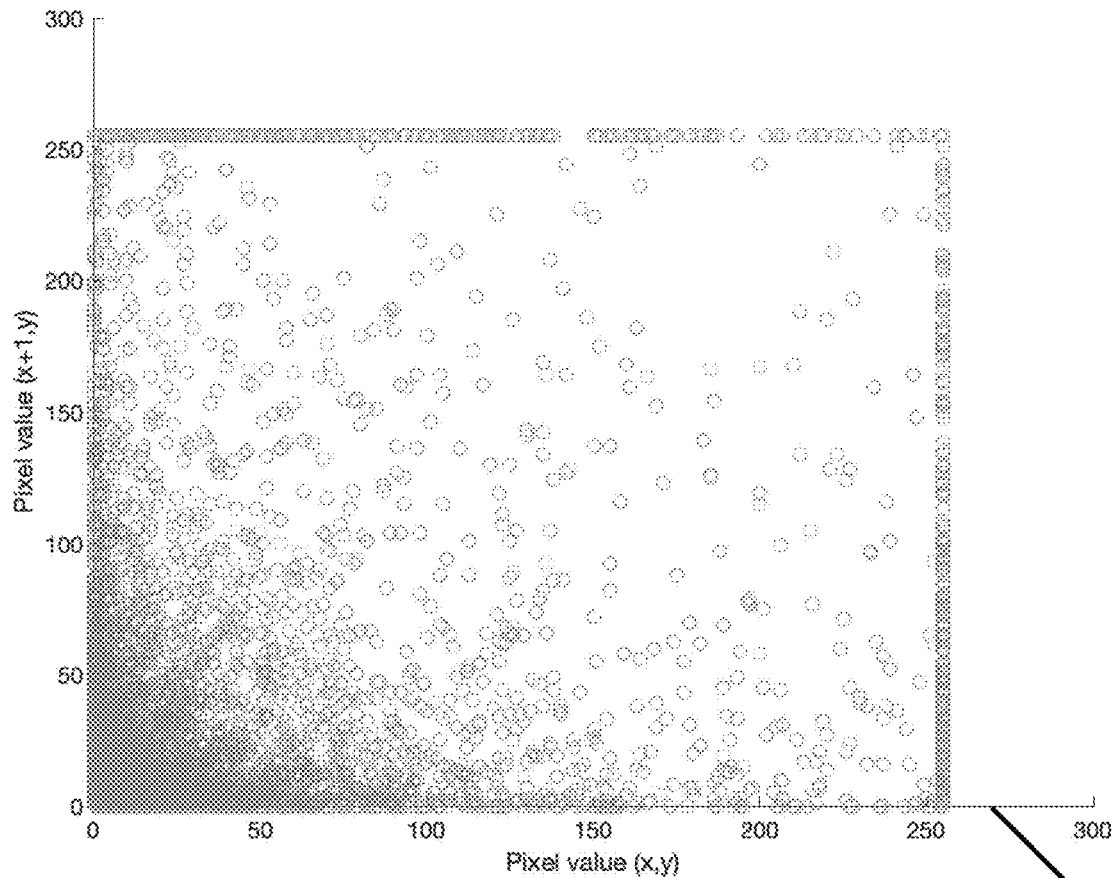
Figure 15:
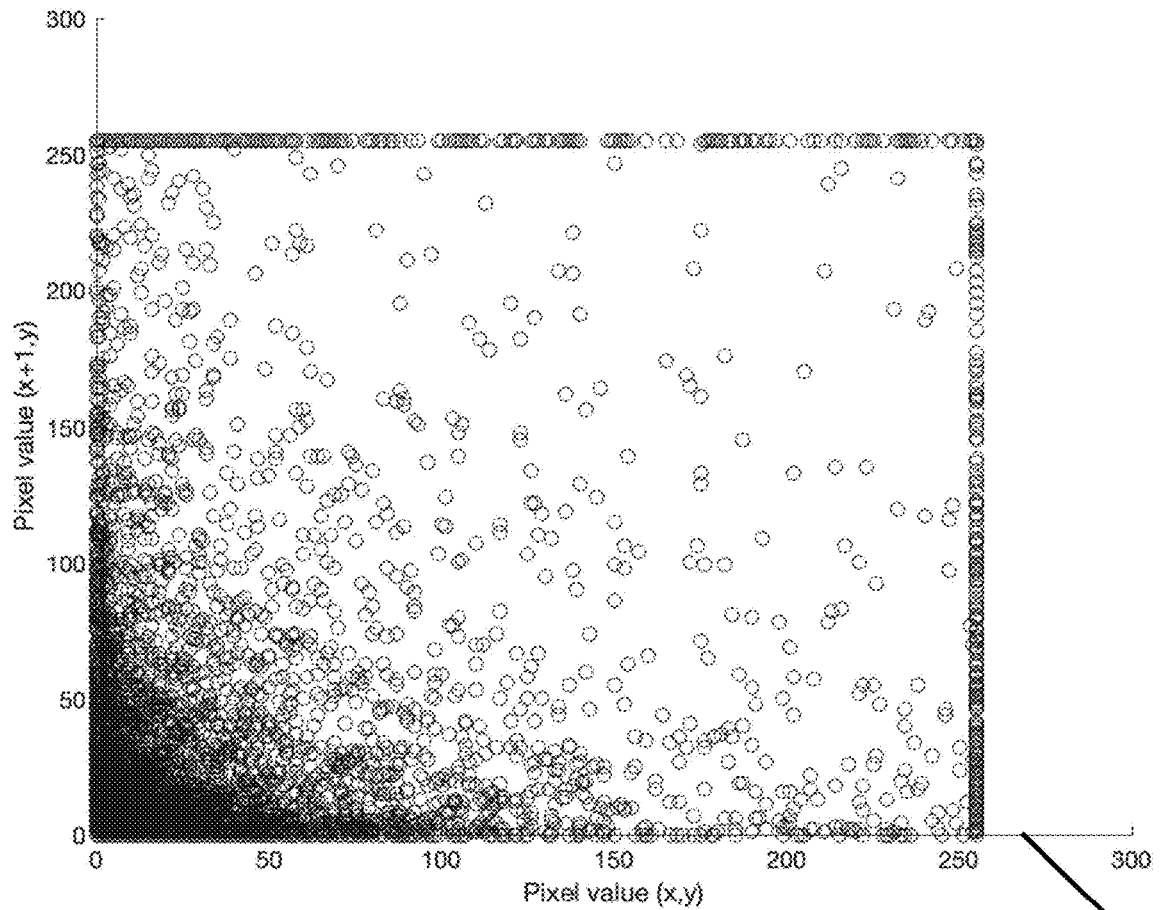

To gauge the success of our encryption algorithm in decorrelating adjacent pixels in cipher images, we performed the following experiment with the results shown in FIG. 15. In an image (original or ciphered), we randomly selected 20,000 pixels, and for each pixel, we selected its horizontal (right) neighbor. Thus, six plots were made. The correlation coefficient of the red channel (graph 124) of the 20,000 pixels (random variable A) and their right neighbors (random variable B), with green channel graph 126, and blue channel graph 128. The calculations in all channels with vertical and diagonal neighbors were repeated. The averages of five runs of these calculations using four plain images and their encrypted versions are tabulated in Table 136 of FIG. 15.

The table 136 contains the correlation coefficients of four plain and cipher images of adjacent pixels on RGB channels, show are red correction graph 130, green correlation graph 132, and blue correlation graph 134. It is evident that while the pixels of the original images are highly correlated, their ciphered counterparts are decorrelated. It is clear from these values that the present encryption algorithm successfully decorrelates the highly correlated adjacent pixels in all channels.

To utilize the present algorithm over a non-secure channel, one can choose an encryption algorithm to encrypt the frequency vector. Depending on the intended use of the application, one can choose an encryption algorithm from various standards. For example, the Advanced Encryption Standard (AES) Cipher Algorithm in Cipher Block Chaining (CBC) mode. The official specification for AES issued by the National Institute of Standards and Technology (NIST) are commonly available. One can use the open source implementation of AES by OpenSSL. A unique 256-bit encryption key and 128-bit initialization vector (IV) are generated using gen_params( ) method of libcrypto library of OpenSSL in each run. The auto-generated encryption key and IV are stored in a file as 48=32+16 bytes. As shown in the system FIG. 16, the output of our proposed concurrent encryption-compression algorithm implementation consists of two files. One file contains the encryption key 164 and IV information (48 bytes) only. The other file 166 includes the compressed data along with its encrypted inversion frequency vector 156 (1040 bytes) appended at the end.

Figure 16:
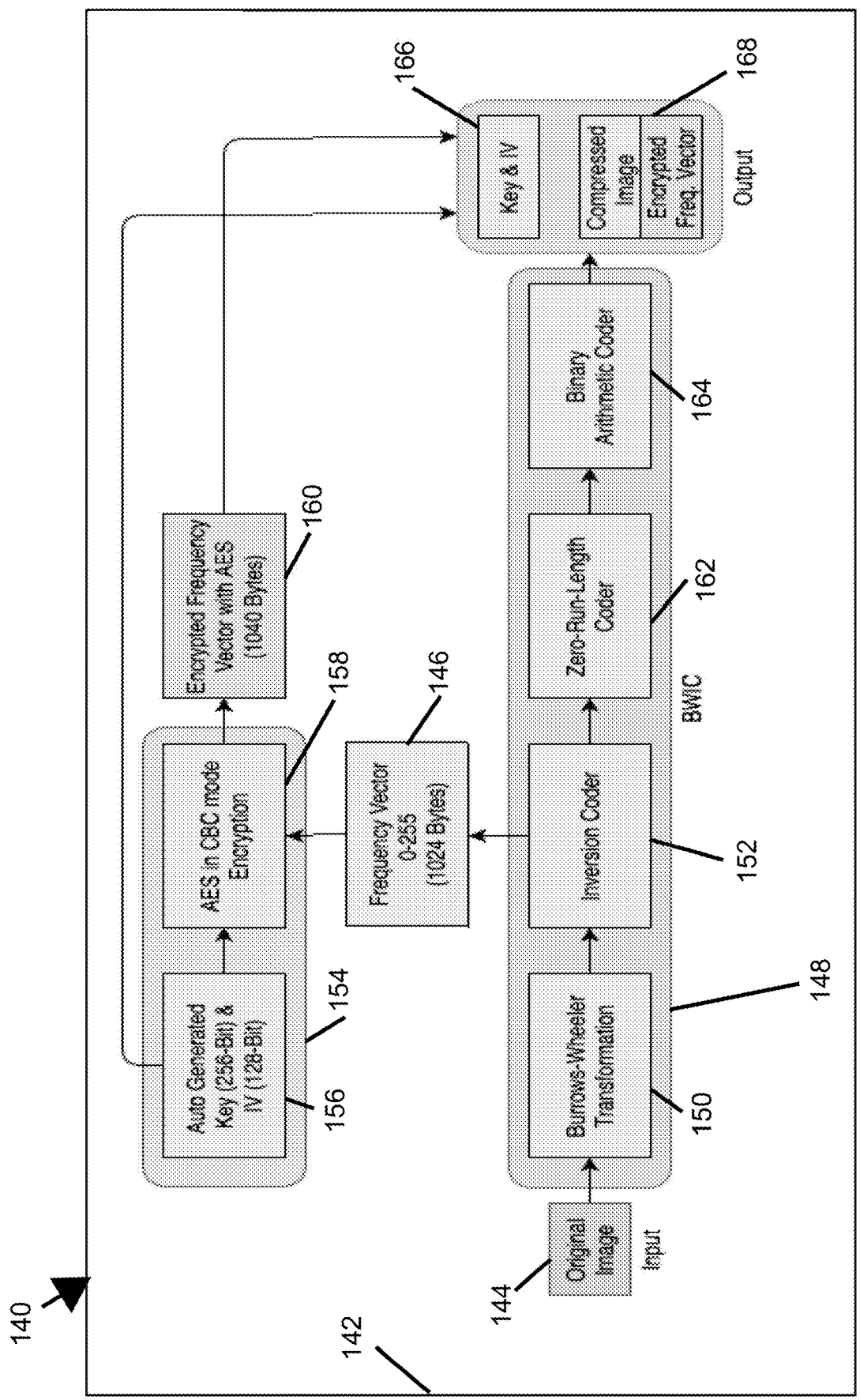
FIG. 16 is a schematic diagram of one embodiment of a concurrent encryption and lossless compression system.

FIG. 16 is a schematic diagram of one embodiment of a concurrent encryption and lossless compression system 140 for concurrent encryption and lossless compression of data utilizing AES. A computer platform 142 configured to receive and transmit one or more data files, such as input file 1448. A frequency vector module 146 is resident on the computer platform 142 that selectively calculates and stores an inversion frequency vector for encryption, and a lossless compressor 148 is also resident. The lossless compressor 148 includes a BWT module 150 that selectively performs a Burrows-Wheeler transformation on one or more data files 144 received at the computer platform 142, thereby creating one or more Burrows-Wheeler transformed files. There is an inversion coder 152 that selectively performs an inversion ranking transformation on the one or more Burrows-Wheeler transformed files thereby creating one or more inversion files, where the inversion coder is in selective communication with the frequency vector module 146 such that the frequency vector module calculates an inversion frequency vector for the one or more inversion files.

In this embodiment, there is an encryption module 154 the implements AES. The encryption module 154 includes a key generator 156 and AES/CBC encryptor 158. The frequency vector is then encrypted with AES (104) bytes (module 160) and then output with the compressed file 168.

Returning to the lossless compressor 148, there also is a zero-run-length encoder 162 that selectively compresses the one or more inversion files thereby creating one or more zero-run-length files, and an entropy coder, shown here as a binary arithmetic coder 164, selectively compresses the one or more zero-run-length files to create one or more fully compressed files. The frequency vector module 146, or other device, further joins the AES encrypted inversion frequency vector with the one or more fully compressed files (Key & IV 166), thereby creating one or more encrypted and compressed output files 168.

FIG. 17 is a schematic diagram of one embodiment of a concurrent decryption and lossless compression system 170 utilizing AES for encryption of the frequency vector. FIG. 17 essentially traces the steps of the encryption-compression in reverse order of the AES encryption of FIG. 16. First, the encrypted inversion frequency vector 168 is extracted from the combined file 168 and decrypted at AES encryption module 154. The encryption module 154 includes a key decryption module 176 and AES/CBC encryptor 158. Then the AES-decrypted frequency vector is output at module 174 and the frequency vector module 146 returns the fully decrypted frequency vector to the inversion encoder 152. With the necessary inversion frequency vector at hand, the decompression steps proceed with the BWIC decompressor 172, yielding the original file as the output.

On computer platform 142, which can be the same platform for the compressor 148 in FIG. 16, and the frequency vector module 146 is resident on the computer platform 142 with a decompressor 172 also resident. The lossless decompressor 172 basically runs in the reverse order to the compressor 148. The entropy coder, shown here as a binary arithmetic coder 164, receives the decrypted data stream of the file and start to selectively uncompress it to create one or more zero-run-length files for the a zero-run-length encoder 162 that selectively decompresses them to create one or more inversion files sent to the inversion coder 152 that selectively reverses the inversion ranking transformation to create one or more Burrows-Wheeler transformed files which are sent to the BWT module 150 that selectively performs a reverse Burrows-Wheeler transformation to create a fully decrypted and uncompressed one or more data files 144 at the computer platform 142.

The run-time gains from the encryption of the present invention is readily apparent over that of encryption algorithms utilizing either EtC or CtE algorithms. To determine the growth rate of the execution time of AES as a function of the input file size, one can use the OpenSSL random number generator, one dozen random data files ranging in size from 0.1 MB to 50 MB and measured the encryption times of these files with AES. To measure the running times of AES algorithm accurately, these measurements were repeated several times and calculated their averages.

Figure 18:
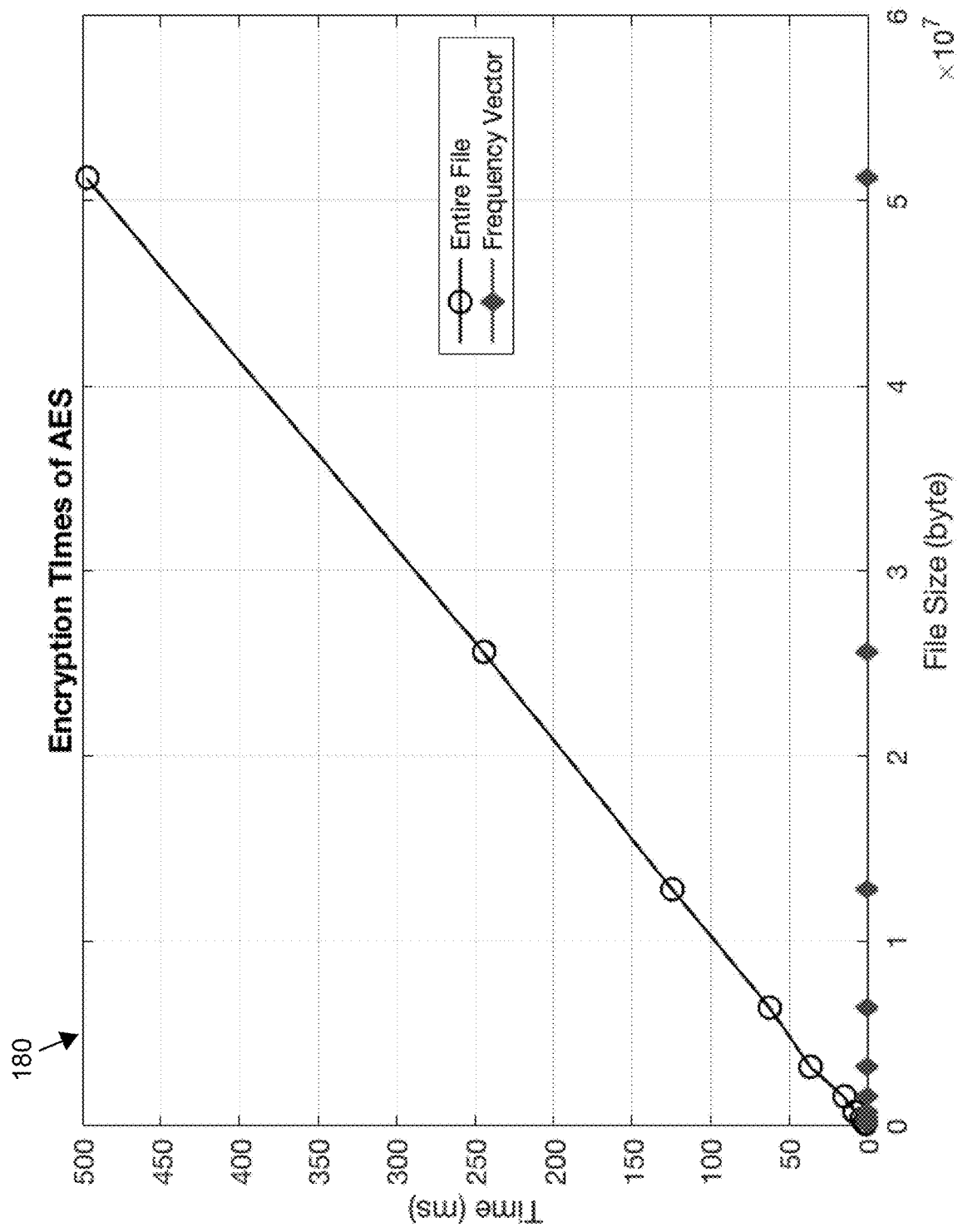
FIG. 18 is a graph of encryption run-times of OpenSSL implementation of AES for various files sizes.

As seen in FIG. 18, the encryption times grow linearly as a function of the file size, with a growth rate of approximately 0.98. FIG. 18 is a graph 180 of Encryption run-times of OpenSSL implementation of AES for various files sizes (100,000-51,200,000 bytes). In the present algorithm, regardless of the size of the input file, only the frequency vector F is encrypted of the input file resulting from IC, as described previously. Since F is always a small file consisting of 1024 bytes, our algorithm affords considerable gains in execution times for encryption over the common practice of encrypting the entire input file.

Gains in encryption times are significant for large files. For instance, while it takes 490 ms to encrypt a 50 MB file with AES (on a system with macOS 10.13.6, 2.6 GHz Intel 17-4960HQ, 16 GB RAM), encrypting a 1024-byte frequency vector requires only 0.39 ms. Decryption times of AES are comparable to those of encryption.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A system for concurrent encryption and lossless compression of data, comprising:
   a computer platform configured to receive and transmit one or more data files;
   a frequency vector module resident on the computer platform that selectively calculates and stores an inversion frequency vector for encryption;
   a lossless compressor resident on the computer platform, including:
      a BWT module that selectively performs a Burrows-Wheeler transformation on one or more data files received at the computer platform, thereby creating one or more Burrows-Wheeler transformed files;
      an inversion coder that selectively performs an inversion ranking transformation on the one or more Burrows-Wheeler transformed files thereby creating one or more inversion files, the inversion coder in selective communication with the frequency vector module such that the frequency vector module calculates an inversion frequency vector for the one or more inversion files;
      a zero-run-length encoder that selectively compresses the one or more inversion files thereby creating one or more zero-run-length files; and
      an entropy coder that selectively compresses the one or more zero-run-length files to create one or more fully compressed files; and
   wherein the frequency vector module further encrypts the inversion frequency vector and joins the encrypted inversion frequency vector with the one or more fully compressed files, thereby creating one or more encrypted and compressed output files.

2. The system of claim 1, wherein the computer platform is in selective communication with a network and further configured to selectively transmit the one or more encrypted and compressed output files across the network.

3. The system of claim 2, wherein the computer platform selectively receives one or more encrypted and compressed output files from the network, and computer platform further includes a decompressor that decrypts and uncompresses the received one or more encrypted and compressed output files.

4. The system of claim 1, wherein the frequency vector module and lossless compressor are configured in firmware resident on the computer platform.

5. The system of claim 1, wherein the frequency vector module and lossless compressor are configured in software modules resident on the computer platform.

6. The system of claim 1, wherein the frequency vector module further encrypts the inversion frequency vector with an Advanced Encryption Standard (AES) Cipher Algorithm.

7. The system of claim 1, wherein the entropy coder is a binary arithmetic coder.

8. A method for concurrent encryption and lossless compression of data, comprising the steps of:
   receiving one or more files at a computer platform configured to receive and transmit one or more data files;
   compressing the received one or more data files by:
      performing a Burrows-Wheeler transformation on the received one or more data files received at the computer platform thereby creating one or more Burrows-Wheeler transformed files;
      performing an inversion ranking transformation on the one or more Burrows-Wheeler transformed files thereby creating one or more inversion files;
      calculating an inversion frequency vector for the one or more inversion files at a frequency vector module such that the frequency vector module, the frequency vector module resident on the computer platform and selectively calculating and storing the inversion frequency vector for encryption;
      compressing the one or more inversion files thereby creating one or more zero-run-length files; and
      compressing the one or more zero-run-length files at an entropy coder to create one or more fully compressed files; and
   encrypting the one or more fully compressed files by:
      encrypting the inversion frequency vector; and
      joining the encrypted inversion frequency vector with the one or more fully compressed files, thereby creating one or more encrypted and compressed output files.

9. The method of claim 8, wherein the computer platform is connected to a network, and further including selectively transmitting the one or more encrypted and compressed output files across the network from the computer platform.

10. The method of claim 9, further including:
    selectively receiving one or more encrypted output files from the network; and
    decrypting and uncompressing the received one or more encrypted and compressed output files at a decompressor resident on the computer platform.

11. The method of claim 8, wherein the steps are performed by firmware resident on the computer platform.

12. The method of claim 8, wherein the steps are performed by software modules resident on the computer platform.

13. The method of claim 8, wherein encrypting the inversion frequency vector is encryption with an Advanced Encryption Standard (AES) Cipher Algorithm.

14. The method of claim 8, wherein compressing the one or more zero-run-length files at an entropy coder is compression with a binary arithmetic coder.

15. A non-transitory computer readable medium containing program instructions for concurrent encryption and lossless compression of data, wherein execution of the program instructions by one or more processors of a computer system causes the one or more processors to carry out the steps of:
   receiving one or more files at a computer platform configured to receive and transmit one or more data files;
   compressing the received one or more data files by:
      performing a Burrows-Wheeler transformation on the received one or more data files received at the computer platform thereby creating one or more Burrows-Wheeler transformed files;
      performing an inversion ranking transformation on the one or more Burrows-Wheeler transformed files thereby creating one or more inversion files;
      calculating an inversion frequency vector for the one or more inversion files at a frequency vector module such that the frequency vector module, the frequency vector module resident on the computer platform and selectively calculating and storing the inversion frequency vector for encryption;
      compressing the one or more inversion files thereby creating one or more zero-run-length files; and
      compressing the one or more zero-run-length files at an entropy coder to create one or more fully compressed files; and
   encrypting the one or more fully compressed files by:
      encrypting the inversion frequency vector; and
      joining the encrypted inversion frequency vector with the one or more fully compressed files, thereby creating one or more encrypted and compressed output files.

16. The computer readable medium of claim 8, wherein the computer platform is connected to a network, and execution of the program instructions by one or more processors of a computer system further causes the one or more processors to carry out the step of selectively transmitting the one or more encrypted and compressed output files across the network from the computer platform.

17. The computer readable medium of claim 15, wherein execution of the program instructions by one or more processors of a computer system further causes the one or more processors to carry out the steps of:
   receiving one or more encrypted output files from the network; and
   decrypting and uncompressing the received one or more encrypted and compressed output files at a decompressor resident on the computer platform.

18. The computer readable medium of claim 15, wherein execution of the program instructions by one or more processors of a computer system further causes the one or more processors to carry out the step of encrypting the inversion frequency vector with an Advanced Encryption Standard (AES) Cipher Algorithm.

19. The computer readable medium of claim 15, wherein execution of the program instructions by one or more processors of a computer system further causes the one or more processors to carry out the step of compressing the one or more zero-run-length files with a binary arithmetic coder.

20. The computer readable medium of claim 15, wherein execution of the program instructions by one or more processors of a computer system further causes the one or more processors to carry out the step of configuring a compressor module and a frequency vector module.

* * * * *